(12) United States Patent  (10) Patent No.: US 12,526,514 B2
Kurota et al.  (45) Date of Patent: Jan. 13, 2026

(54) IMAGE CAPTURING SYSTEM, CONTROL APPARATUS, IMAGE CAPTURING APPARATUS, AND DISPLAY APPARATUS CONSTITUTING THE SYSTEM, CONTROL METHOD, AND DISPLAY METHOD

(71) Applicant: CANON KABUSHIKI KAISHA, Tokyo (JP)

(72) Inventors: Masaru Kurota, Tokyo (JP); Koyo Sato, Tokyo (JP); Masashi Nishiyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 350 days.

(21) Appl. No.: 18/350,567

(22) Filed: Jul. 11, 2023

(65) Prior Publication Data

US 2024/0022812 A1  Jan. 18, 2024

(30) Foreign Application Priority Data

Jul. 12, 2022  (JP) ................................ 2022-111882
Sep. 16, 2022  (JP) ................................ 2022-148288

(51) Int. Cl.
*H04N 23/661*  (2023.01)
*G06T 7/70*  (2017.01)
(Continued)

(52) U.S. Cl.
CPC ............. *H04N 23/661* (2023.01); *G06T 7/70* (2017.01); *H04N 7/183* (2013.01); *H04N 23/62* (2023.01); *G06T 2207/10016* (2013.01)

(58) Field of Classification Search
CPC .... H04N 23/661; H04N 23/69; H04N 23/698; H04N 23/695; H04N 23/66; H04N 23/61;
(Continued)

(56) References Cited

U.S. PATENT DOCUMENTS

2005/0036036 A1  2/2005  Stevenson
2007/0257990 A1  11/2007  Hayashi
(Continued)

FOREIGN PATENT DOCUMENTS

JP  2004129049 A  4/2004
JP  2005086360 A  3/2005

*Primary Examiner* — Xi Wang
(74) *Attorney, Agent, or Firm* — Canon U.S.A., Inc. IP Division

(57) ABSTRACT

An image capturing system includes a first control apparatus, a second control apparatus, and an image capturing apparatus. The first control apparatus includes a first transmitting unit that transmits a first control instruction based on a user's operation to the image capturing apparatus. The second control apparatus includes a second transmitting unit that transmits a second control instruction generated based on a captured image received from the image capturing apparatus to the image capturing apparatus. The image capturing apparatus includes an image capturing unit, a third receiving unit that receives the first control instruction and the second control instruction, and a control unit that controls an image capturing process of the image capturing unit based on the first control instruction and the second control instruction. The time taken for communication of the first control instruction is longer than the time taken for communication of the second control instruction.

25 Claims, 21 Drawing Sheets

(51) Int. Cl.
*H04N 7/18* (2006.01)
*H04N 23/62* (2023.01)

(58) Field of Classification Search
CPC ........ H04N 23/60; H04N 23/62; H04N 7/183; G06V 20/46; G06V 10/94; G06T 2207/10016; G06T 7/70
See application file for complete search history.

(56) References Cited

U.S. PATENT DOCUMENTS

2018/0017659 A1    1/2018   Irie
2024/0284041 A1*   8/2024   Kokubo ................ H04N 23/64

* cited by examiner

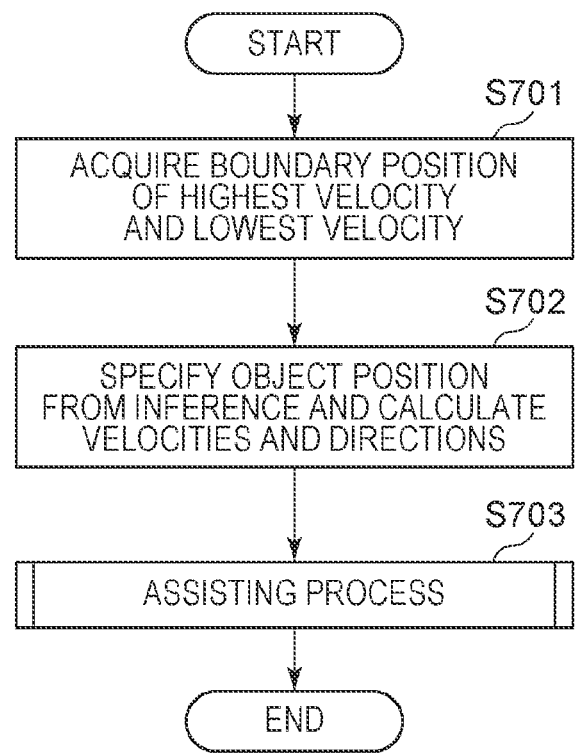

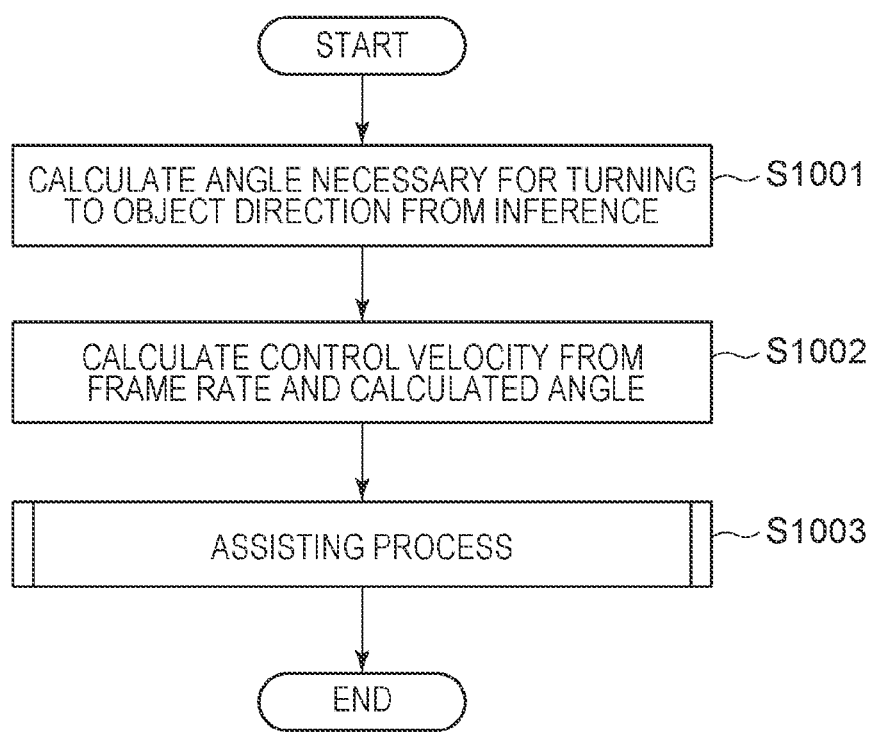

IMAGE CAPTURING SYSTEM, CONTROL
APPARATUS, IMAGE CAPTURING
APPARATUS, AND DISPLAY APPARATUS
CONSTITUTING THE SYSTEM, CONTROL
METHOD, AND DISPLAY METHOD

BACKGROUND OF THE INVENTION

Field of the Invention

The present invention relates to image capturing systems including an image capturing apparatus, and in particular, to an image capturing system configured to control the image capturing apparatus from outside.

Description of the Related Art

A video editing and delivery system using an Internet Protocol (IP) network has recently been increasingly used in video production. Standards for personal computers (PCs) or controllers to control devices via an IP network from remote places and to transmit and receive captured images via, not video cables such as known serial digital interfaces (SDIs), the IP network have recently been adopted. Remote control cameras with such standards incorporated in the camera body have been in widespread use, which allows image capturing by controlling the cameras from remote places even if the users are not on the set.

Meanwhile, automatic shooting in which cameras are controlled according to the motion of the object is performed. This allows shooting without the need for a user's operation. However, the camera may behave in a way not intended by the user. For this reason, a method of combined use with assisted manual operation has been proposed.

Japanese Patent Laid-Open Publication No. 2005-86360 discloses a method for switching between automatic control and manual control, in which the automatic control is activated when no operation is performed for a certain period of time during the manual control. In contrast, Japanese Patent Laid-Open Publication No. 2004-129049 discloses a method for decreasing the degree of difficulty in a tracking operation performed by the user by performing speed control by the camera itself according to the camera operating state and the positional relationship with the object.

To manually operate the camera while the user is checking the captured image, a control instruction based on the user's operation is transmitted to the camera after the user checks the image captured by the camera. However, when the user is in a remote place, a delay in transmitting video signals or control instruction signals can be larger than a delay when a user operated controller and the camera are connected using a dedicated cable network, such as a video cable. Depending on the degree of the communication delay (sometimes referred to as "the amount of communication delay"), the object may have moved to another position at the time when the user checks the captured image. For this reason, at the time when a control instruction based on the user's operation reaches the camera, the operation can be an unintended operation.

SUMMARY OF THE INVENTION

Accordingly, the present invention provides an image capturing system configured to reduce a decrease in operation performance of remote shooting even when the delay of communication between a controller that receives a user's operation and a camera is large.

An image capturing system according to an aspect of the present invention includes a first control apparatus, a second control apparatus, and an image capturing apparatus. The first control apparatus includes a first control receiving unit configured to receive an operation from a user and a first transmitting unit configured to transmit a first control instruction based on the operation to the image capturing apparatus. The second control apparatus includes a second receiving unit configured to receive a captured image from the image capturing apparatus, a generating unit configured to generate a second control instruction based on the captured image, and a second transmitting unit configured to transmit the second control instruction to the image capturing apparatus. The image capturing apparatus includes an image capturing unit, a third receiving unit configured to receive the first control instruction from the first control apparatus and the second control instruction from the second control apparatus, and a control unit configured to control an image capturing process performed by the image capturing unit based on a control instruction received by the third receiving unit. Time from when the first control apparatus transmits the first control instruction to when the image capturing apparatus receives the first control instruction is longer than time from when the second control apparatus transmits the second control instruction to when the image capturing apparatus receives the second control instruction. The control unit is configured to control the image capturing process based on the first control instruction and the second control instruction.

Other aspects of the present invention will become apparent from the following description of the embodiments.

Further features of the present invention will become apparent from the following description of embodiments with reference to the attached drawings.

BRIEF DESCRIPTION OF THE DRAWINGS

FIGS. 7A to 7C are flowcharts for an assisting operation in a first embodiment.

FIG. 10 is a flowchart for velocity determination with reference to the coordinates position of the object in the real world in a second embodiment.

DESCRIPTION OF THE EMBODIMENTS

Embodiments of the present invention will be described in detail hereinbelow with reference to the accompanying drawings, in which like components are given like reference signs, and descriptions thereof will be omitted.

First Embodiment

Description of Configuration of Image Capturing System

Figure 1:
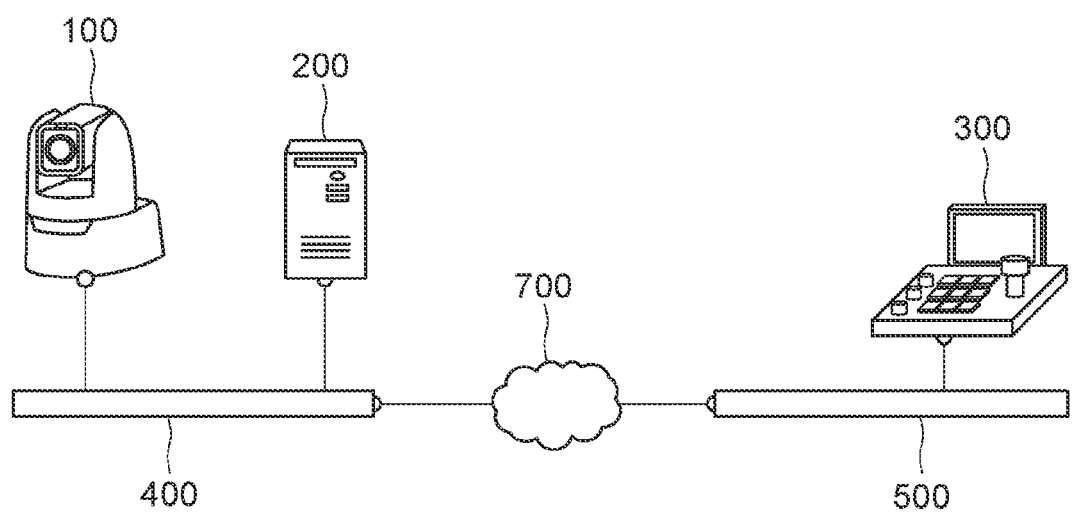
FIG. 1 is a diagram illustrating an example of the configuration of an entire system of first to third embodiments.

FIG. 1 is a diagram illustrating an example of the configuration of an image capturing system that performs a process according to this embodiment.

In FIG. 1, the image capturing system includes a camera 100, an information processing apparatus 200 (also referred to as "second control apparatus"), and a controller 300 (also referred to as "first control apparatus"). The camera 100 and the information processing apparatus 200 are connected to a network formed on a local area network (LAN) 400. The controller 300 is connected to another LAN 500. The LAN 400 and the LAN 500 are connected via the Internet 700 to form a mutually communicable network according to a communication protocol. Either wired or wireless communication may be employed. The camera 100 and the information processing apparatus 200 are disposed at physically close positions. The controller 300 is disposed at a position distant therefrom. For this reason, communication via the Internet 700 is delayed as compared with communication in the LAN 400 or LAN 500.

The camera 100 is an image capturing apparatus capable of capturing an image of an object being tracked and a predetermined range around the object and outputs the captured image to the information processing apparatus 200 and the controller 300. The camera 100 of this embodiment includes a network interface. Alternatively, the camera 100 may transfer video to the information processing apparatus 200 via a video transmission cable, such as an SDI or a high-definition multimedia interface (HDMI®). The camera 100 includes a driving unit 109, described later, which provides a pan-tilt mechanism for changing the image capturing direction.

The information processing apparatus 200 receives an image captured by the camera 100 and infers the position of the object in the received image using a learning model. The information processing apparatus 200 transmits a second control instruction, which is an instruction to control the image capturing direction of the camera 100, to the camera 100 on the basis of the inference. The second control instruction may contain information on the zoom position (focal length) determined from the inferred object position.

The controller 300 can acquire the image output from the camera 100, control image capturing based on the user's operation, and set various image capturing conditions by accessing the camera 100 via the Internet 700. The image in the embodiments includes both the frames of a moving image and a still image, and this embodiment is applicable to both of them.

Figure 2:
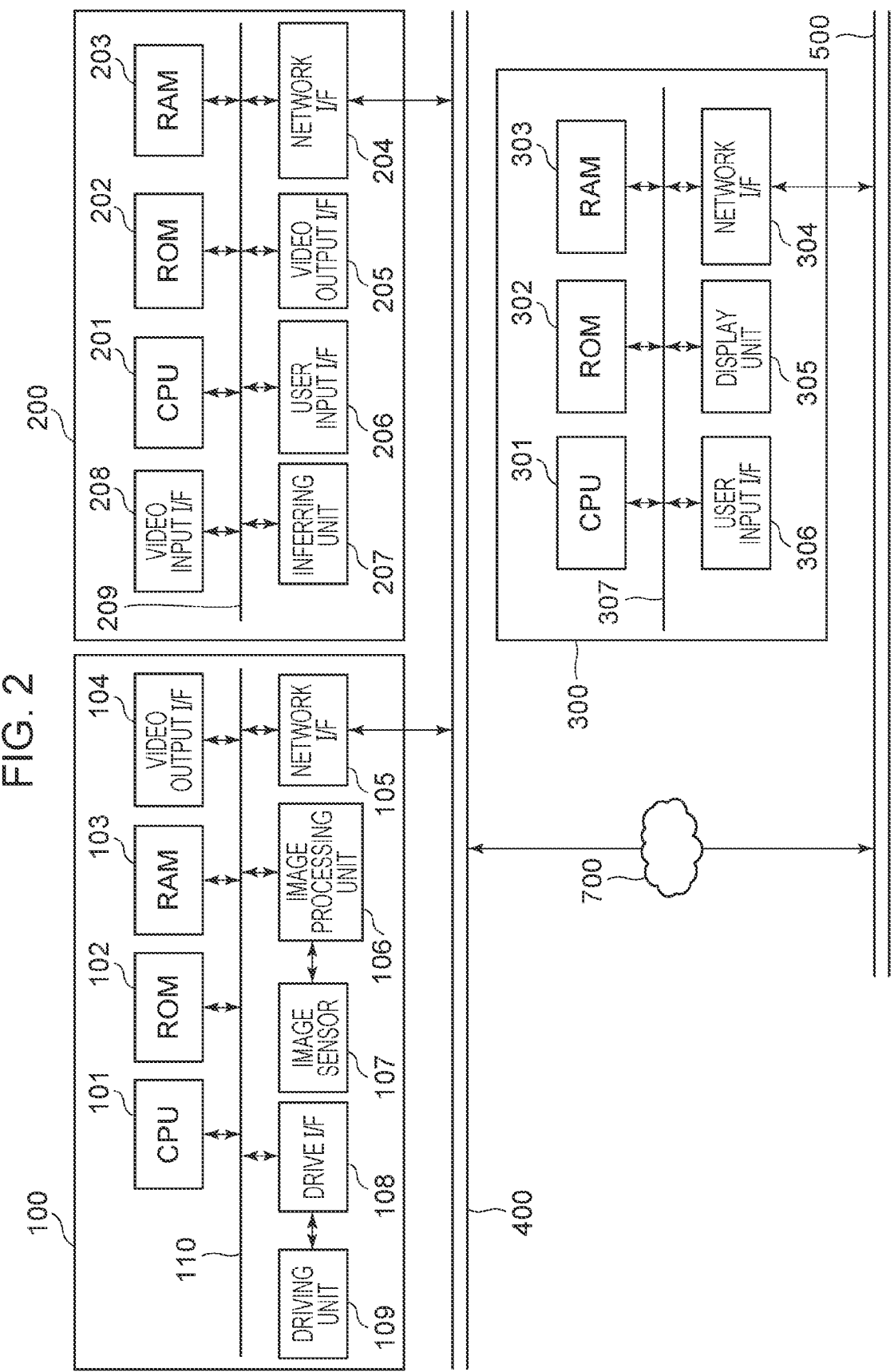
FIG. 2 is a hardware block diagram of the system of the first to third embodiments.

FIG. 2 is a hardware block diagram of the camera 100, the information processing apparatus 200, and the controller 300 constituting the system. The configurations of the apparatuses will be described.

The camera 100 of this embodiment includes a central processing unit (CPU) 101, a read-only memory (ROM) 102, a random-access memory (RAM) 103, a video input interface (I/F) 104, a network OF 105, an image processing unit 106, an image sensor 107, a drive OF 108, the driving unit 109, and an internal bus 110 that communicably connects the above components.

The CPU 101 controls the components of the camera 100 to control the entire apparatus.

The ROM 102 is a non-volatile storage device, which is typified by a flash memory, a hard disk drive (HDD), a solid-state drive (SSD), and a secure digital (SD) card, and is used as a persistent storage area for an operating system (OS), various programs, and various kinds of data and also as a short-term storage area for various kinds of data.

The RAM 103 is a high-speed volatile storage device, which is typified by a dynamic RAM (DRAM), on which an OS, various programs, and various kinds of data are loaded, and which is also used as a working area for the OS and the various programs.

The video output OF 104 is an interface for outputting video captured by the image sensor 107, described later, to an external device. Examples include an SDI and a high-definition multimedia interface (HDMI).

The network OF 105 is an interface for connecting to the LAN 400 described above and takes charge of communication with external devices, such as the information processing apparatus 200 and the controller 300, via a communication medium, such as Ethernet®. Remote control of the camera 100 may be performed via another interface, such as a serial communication OF (not shown).

The image processing unit 106 connects to the image sensor 107 and converts image data acquired from the image sensor 107 to a predetermined format, compresses the data as necessary, and transfers it to the RAM 103.

Examples of the image sensor 107 include a charge-coupled device (CCD) and a complementary metal-oxide semiconductor (CMOS), which function as an image capturing unit in the camera 100. The image sensor 107 generates image data by photoelectrically converting an object image formed by an image-capturing optical system (not shown). The image-capturing optical system and the image sensor 107 may be collectively referred to as "image capturing unit".

The drive I/F 108 is an interface for transmitting an instruction from the CPU 101 to the driving unit 109.

The driving unit 109 includes a mechanism for changing the image capturing direction of the camera 100 and an optical system. In this embodiment, the image capturing direction is changed by rotationally driving the image sensor 107 and lenses constituting the image-capturing optical system together. The driving unit 109 includes a mechanical drive system and a motor for a drive source. The driving unit 109 performs rotational driving, such as pan/tilt operation, for changing the image capturing direction with respect to the horizontal direction or the vertical direction in response to an instruction from the CPU 101 via the drive I/F 108. If the image-capturing optical system includes a variable power lens (also referred to as "zoom lens", the driving unit 109 may perform a zooming operation for optically changing the image capturing angle of view by moving the zoom lens in the optical axis direction. Next, the information processing apparatus (a second control apparatus) 200 will be described.

The information processing apparatus 200 includes a CPU 201, a ROM 202, a RAM 203, a network I/F 204, a video output I/F 205, a user input I/F 206, an inferring unit 207, a video input I/F 208, which are mutually connected via an internal bus 209.

The CPU 201 controls the components of the information processing apparatus 200 to control the entire apparatus. The CPU 201 generates the second control instruction to control the image capturing direction of the camera 100 on the basis of information indicating the position of the object received from the inferring unit 207, described later.

The ROM 202 is a non-volatile storage device, which is typified by a flash memory, an HDD, an SSD, and an SD card, and is used as a persistent storage area for an OS, various programs, and various kinds of data and also as a short-term storage area for various kinds of data.

The RAM 203 is a high-speed volatile storage device, which is typified by a DRAM, on which an OS, various programs, and various kinds of data are loaded, and which is also used as a working area for the OS and the various programs.

The network OF 204 is an interface for connecting to the LAN 400 described above and takes charge of communication with the camera 100 via a communication medium, such as Ethernet®. The communication here includes transmission of control instructions to the camera 100 and reception of captured images from the camera 100.

The video output OF 205 is an interface for outputting video to an external device. Examples include an SDI and an HDMI. Examples of the connected device include a liquid crystal panel and an organic electroluminescence (EL) panel. The information processing apparatus 200 is capable of generating a control instruction for the camera 100 on the basis of a received captured image. For this reason, the information processing apparatus 200 does not necessarily need to present the captured image to the user.

The user input OF 206 is an interface for receiving an instruction from the user and transmitting an instruction signal to the CPU 201. A specific example is an interface, such as a universal serial bus (USB), for connecting to an input device, such as a mouse, a keyboard, or a touch panel.

The video output OF 205 and the user input OF 206 constitute a user interface between the user and the information processing apparatus 200.

The inferring unit 207 is used to infer the position of a predetermined object and whether the object is present using a learned model from video received from the camera 100 via the video input OF 208. The inferring unit 207 is an arithmetic device specialized for image processing and inference processing, such as a what-is-called graphics processing unit (GPU). The GPU is generally effective in learning processing and inference processing using a learned model generated by learning processing. However, the inference processing may be achieved using a reconfigurable logic circuit, such as a field-programmable gate array (FPGA), or alternatively, the process of the inferring unit 207 may be performed by the CPU 201. As another alternative, multiple kinds of arithmetic device/circuit, such as a GPU, a FPGA, and a CPU, may be combined. In this embodiment, the inference processing is not absolutely necessary provided that an object can be detected based on video received from the camera 100. The inferring unit 207 may be configured to predict the future moving direction and velocity on the basis of the kind of the object and the past movement information so as to control the tracking operation more accurately than a simple configuration for object detection. With the simple configuration for detecting the object position, after the object moves on the image, the position of the object on the image is moved to the original position. Inference allows a pan/tilt operation concurrently with the movement of the object. The information indicating the position of the predetermined object inferred by the inferring unit 207 is transmitted to the CPU 201 via the internal bus 209.

The video input OF 208 is an interface, such as an SDI or a HDMI, for receiving video from the camera 100, described above.

Next, the controller (a first control apparatus) 300 will be described. The controller 300 includes a CPU 301, a ROM 302, a RAM 303, a network OF 304, a display unit 305, and a user input OF 306, which are mutually connected via an internal bus 307.

The CPU 301 controls the components of the controller 300 to control the entire apparatus. The CPU 301 generates a first control instruction to control the image capturing direction of the camera 100 on the basis of a user's operation received via the user input OF 306, described later.

The ROM 302 is a non-volatile storage device, which is typified by a flash memory, an HDD, an SSD, and an SD card, and is used as a persistent storage area for an OS, various programs, and various kinds of data and also as a short-term storage area for various kinds of data.

The RAM 303 is a high-speed volatile storage device, which is typified by a DRAM, on which an OS, various programs, and various kinds of data are loaded, and which is also used as a working area for the OS and the various programs.

The network OF 304 is an interface for connecting to the LAN 500 described above and takes charge of communication with the camera 100 and an external device via a communication medium, such as Ethernet®. The communication here includes transmission of the first control instruction to the camera 100 and reception of captured images from the camera 100.

The display unit 305 displays images acquired from the camera 100 and a setting screen for the controller 300. Examples of the display unit 305 include a liquid crystal panel and an organic EL panel. This is an example in which the controller 300 includes the display unit 305. Alternatively, a display monitor for displaying only captured video and the controller 300 may be separately provided.

The user input OF 306 is an interface (a first control receiving unit) for receiving a user's operation on the controller 300, for example, a button, a dial, a joystick, and a touch panel. Information indicating the operation received by the user input OF 306 is transmitted to the CPU 301 via the internal bus 307.

Description of Basic Operation of Automatic Tracking Operation and Manual Control Operation Next, the basic operation of this system, an operation to control the camera 100 so as to track the detected object with the information processing apparatus 200 and an operation to control the camera 100 on the basis of a user's operation received by the controller 300, will be described. The operation to control the camera 100 so as to track the detected object with the information processing apparatus 200 is referred to as "automatic tracking operation. The operation to control the camera 100 on the basis of a user's operation received by the controller 300 is referred to as "manual control operation".

First, the control for the automatic tracking operation performed by the information processing apparatus 200 will be described with reference to FIGS. 3 and 4.

Figure 3:
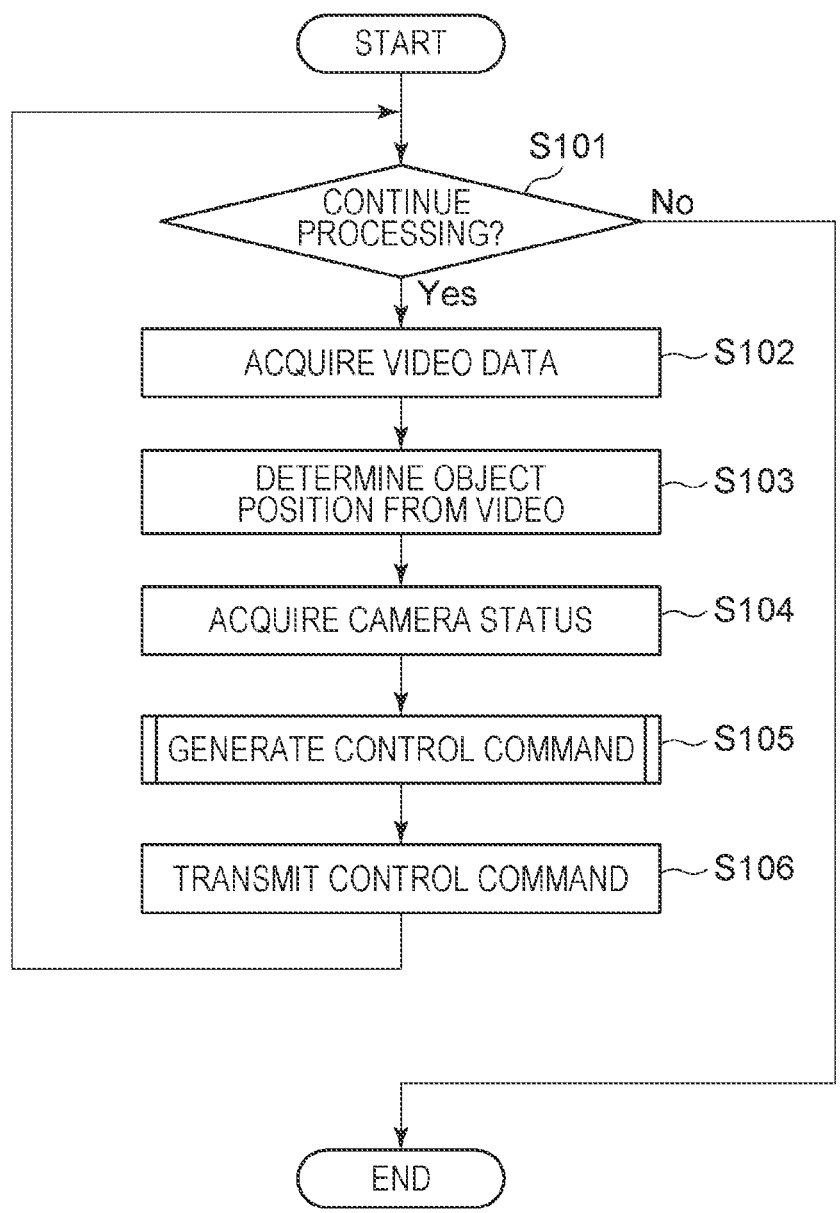
FIG. 3 is a flowchart for the operation of an information processing apparatus.
Figure 4:
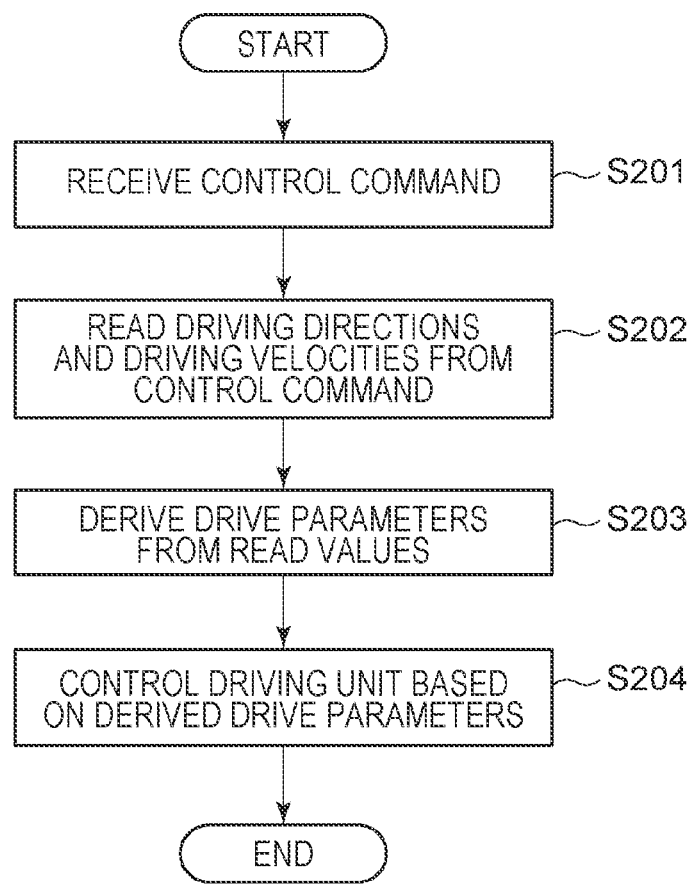
FIG. 4 is a flowchart for the operation of a camera.

FIG. 3 is a control flowchart of the information processing apparatus 200, and FIG. 4 is a control flowchart of the camera 100, which show a sequence of steps in which the information processing apparatus 200 controls the camera 100 according to the position of the object detected from an image captured by the camera 100.

The operation of the information processing apparatus 200 will be described with reference to FIG. 3. This control process is started when the CPU 201 of the information processing apparatus 200 receives an instruction to execute the automatic tracking operation or an assisted manual control operation, described later, via the network OF 204 or the user input OF 206.

In step S101, the CPU 201 determines whether to continue the process. The CPU 201 determines whether an instruction to exit the control process has been received via the network OF 204 or the user input OF 206, and if the exit instruction has not been received, the process goes to step S102. If the exit instruction has been received, the process ends.

In step S102, the information processing apparatus 200 receives video data captured by the camera 100 from the camera 100. The CPU 201 controls the video input I/F 208 so that the video input I/F 208 receives the captured video data from the camera 100 and sequentially writes the received video data to the internal RAM 203. The video data is sequentially transmitted via the video output I/F 104 of the camera 100 according to a predetermined frame rate. The video data may be received via the network I/F 204 and applied to the internal RAM 203.

In step S103, the information processing apparatus 200 determines the positions of the object in the individual frames of the video data captured by the camera 100. The CPU 201 reads the video data written in step S102 from the RAM 203 and inputs the video data to the inferring unit 207. The inferring unit 207 infers the type of the object, the positional information on the object on the captured video, or the like on the basis of the input video data and stores the inference into the RAM 203. The inferring unit 207 has a learned model created using a machine learning technique, such as deep learning. The inferring unit 207 receives video data as input data, and outputs a score indicating the type of the object, such as human, its positional information, and the likelihood. In this embodiment, the positional information is described as coordinates indicating the barycentric position of the object in the image.

In step S104, the information processing apparatus 200 acquires the current control information on the camera 100. The CPU 201 transmits a command to query the current control information to the camera 100 via the network I/F 204 and stores a response to the command into the RAM 203. Examples of the control information include: information regarding driving, such as a maximum angle, a minimum angle, a current angle, possible angular velocities (highest velocity and lowest velocity) in panning/tilting, a maximum angle of view, a minimum angle of view, and a current angle of view in zooming; and information regarding images, such as the resolution and format of the images. Although this embodiment mainly uses the above information as examples, these are given for mere illustrative purposes.

In step S105, the information processing apparatus 200 generates a control command (the second control instruction) for panning/tilting necessary for automatic tracking of the object. The CPU 201 calculates a driving direction and a driving angular velocity of panning/tilting necessary for tracking the object from the positional information on the object stored in the RAM 203 in step S103 and the control information on the camera acquired in step S104. The driving direction indicates in which direction the image capturing direction is to be changed, and the driving angular velocity indicates in which direction the image capturing direction is to be changed. The information processing apparatus 200 converts the driving direction and the driving angular velocity to a control command in accordance with a protocol predetermined to control the camera 100 to generate a control command and writes the control command into the RAM 203. The details of the method for generating the control command will be described later.

In step S106, the CPU 201 transmits the control command written to the RAM 203 in step S105 to the camera 100 via the network I/F 204.

Referring to FIG. 4, a control process for the camera 100 when receiving the second control instruction from the information processing apparatus 200 will be described. This control process is started when the CPU 101 detects the second control instruction that has reached the network OF 105.

In step S201, the camera 100 receives the second control instruction. The CPU 101 reads the second control instruction, which is received via the network OF 105 that functions as a second control instruction receiving unit, and writes the second control instruction into the RAM 103.

In step S202, the CPU 101 reads the values of the driving directions and the driving velocities (driving angular velocities) of panning and tilting from the second control instruction written to the RAM 103 in step S201. The value of the driving direction of panning indicates right or left, and the value of the driving direction of tilting indicates up or down. The driving velocity may have a value in + or − direction, so that the driving velocity contains information on the driving direction.

In step S203, the CPU 101 derives drive parameters for panning and tilting the image capturing unit including the optical system and the image sensor 107 in a desired direction and at a desired speed on the basis of the control values read in step S202. The drive parameters are parameters for controlling motors (not shown) for the panning direction and the tilting directions included in the driving unit 109. For example, the drive parameter may be obtained by converting a driving velocity contained in the received second control instruction to a drive parameter with reference to a conversion table stored in advance in the RAM 103.

In step S204, the CPU 101 controls the driving unit 109 via the drive OF 108 on the basis of the derived drive parameters. The driving unit 109 rotates on the basis of the parameters to change the image capturing direction of the camera 100, that is, to perform a pan/tilt operation.

Next, the manual control operation for controlling the camera 100 using the controller 300 according to a user's operation will be described with reference to FIG. 5. In the case of the manual control operation, the camera 100 is controlled according to the first control instruction transmitted from the controller 300. Since the operation of the camera 100 is the same as in FIG. 4, a description thereof is omitted. Replacing the second control instruction in steps S201 to S204 with the first control instruction forms a control process for the camera 100 in the manual control operation.

The process for the manual control operation performed by the controller 300, shown in FIG. 5, will be described. This control process is started when the CPU 301 detects a user's operation performed on the user input I/F 306. In the manual control, pan/tilt is performed according to a user's operation. For this reason, if the motion of the object and the user's operation differ, tracking of the object is not performed. Although the user's operation in this embodiment is performed using a joystick, another operating member may be used.

In step S301, the CPU 301 of the controller 300 detects the user's joystick operation via the user input I/F 306.

In step S302, the CPU 301 obtains the operating direction and amount of the joystick from the user input I/F 306. A specific example of the joystick adopts an analog output specification using voltages output from variable resistors individually provided for the panning direction and the tilting direction. The CPU 301 can determine the angular velocities in the panning direction and the tilting direction by reading digital values obtained by converting the voltages input from the joystick via an analog-digital (A/D) converter (not shown). The A/D converter allows values corresponding to angular velocities to be read as components in the panning and tilting directions according to the amount of operation in a predetermined range, for example, 0 to 1,023.

In step S303, the CPU 301 generates a control command by converting the operating direction and amount of the joystick to driving directions and driving angular velocities in the panning direction and the tilting direction. The CPU 301 converts the operating direction and amount of the joystick in the X-axis direction (the lateral direction) to a control command for the driving direction and the driving velocity of the panning operation and converts the operating direction and amount in the Y-axis direction (the vertical direction) to a control command for the driving direction and the driving velocity of the tilting operation. This conversion is performed by the CPU 301 in accordance with a protocol predetermined to control the camera 100, and the converted control command is written into the RAM 303.

In step S304, the CPU 301 reads the control command written to the RAM 303 in S303 and transmits the control command as the first control instruction to the camera 100 via the network OF 304.

Thus, the control process performed by the controller 300 and the camera 100 allows the manual control operation of the camera 100 according to the user's operation to be performed.

Description of Assist Operation

In the automatic tracking operation and the manual control operation, how the information processing apparatus 200 and the controller 300 independently control the image capturing process (panning operation and tilting operation) of the camera 100 is described. In this embodiment, if the amount of communication delay between the camera 100 and the controller 300 is large, an assisting operation for assisting the manual control operation is performed to reduce a decrease in operation performance caused by the large communication delay. Whether to perform the manual control operation in an assist mode in which the assisting operation is enabled (assist mode ON/OFF) may be set by the user using a selecting unit. In some embodiment, only when the assisting operation is set ON, the assisting operation described below is performed. With this configuration, if the assist mode is set OFF, either of the information processing apparatus 200 and the controller 300 independently controls the pan/tilt operation of the camera 100.

Figure 6:
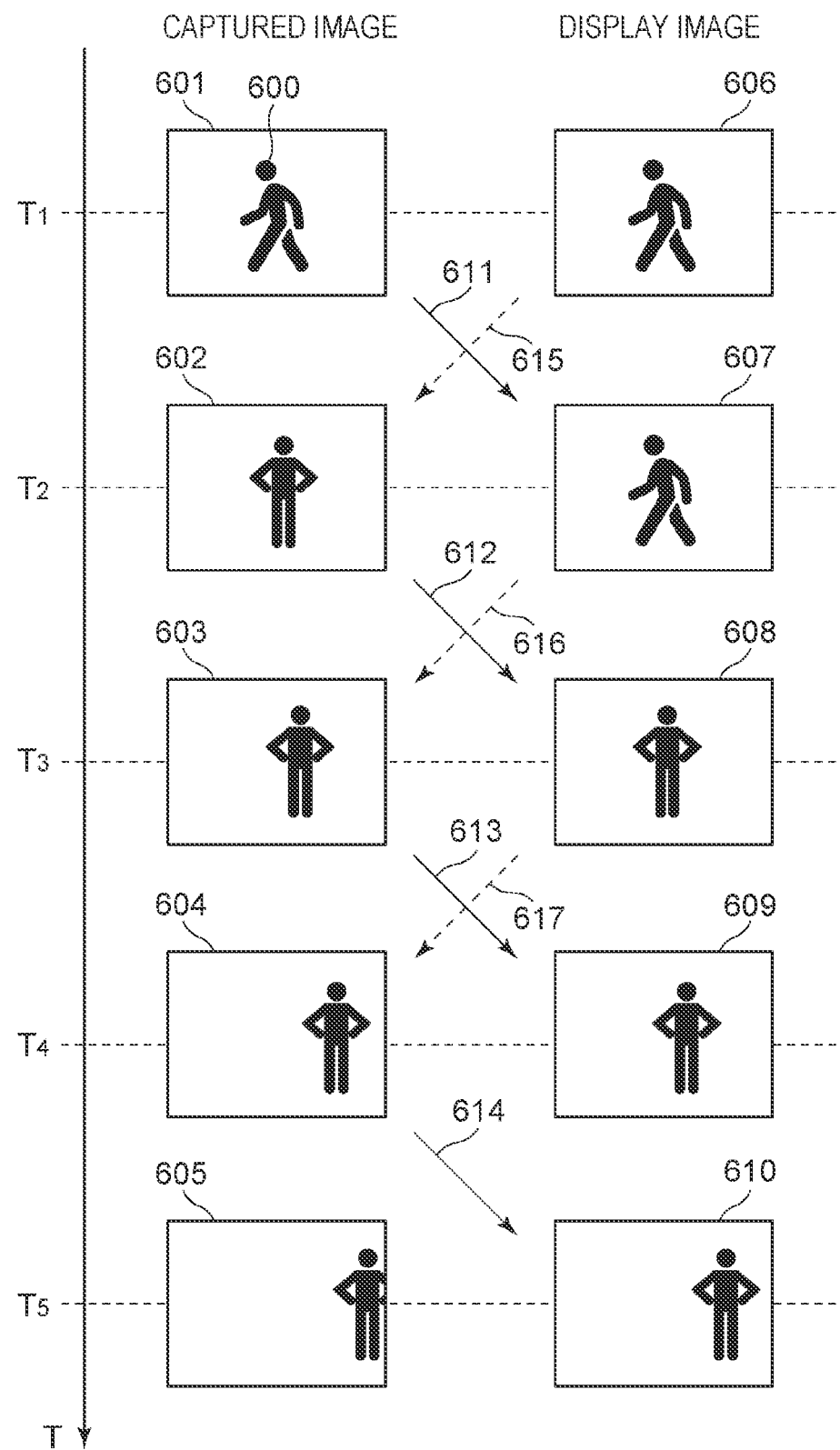
FIG. 6 is a diagram illustrating an example of decrease in operation performance due to a communication delay.

The decrease in operation performance due to communication delay will be described with reference to FIG. 6.

Images 601 to 605 at the left of the drawing are images captured by the camera 100. Images 606 to 610 at the right are images displayed on the controller 300. The individual images are captured or displayed at time $T_1$ to $T_5$. The camera 100 and the controller 300 are connected via the Internet 700 in situations of large communication delays. This shows that the image 601 captured by the camera 100 at time $T_1$ reaches the controller 300 at time $T_2$ and is displayed as the image 607. Similarly, the image 602 corresponds to the image 608, the image 603 corresponds to the image 609, and the image 604 corresponds to the image 610. Communications 611 to 614 indicate transmission of the captured images from the camera 100 to the controller 300. Communications 615 to 617 indicate transmission of the first control instruction from the controller 300 to the camera 100. For example, the first control instruction 615 is transmitted from the controller 300 at time $T_1$ but is received by the camera 100 at time $T_2$, at which the control is applied to the image 602. The user operates the operating member of the controller 300 so that the object 600 is disposed at the center of the image capturing range of the camera 100 (hereinafter referred to as "image center").

The description will be continued focusing on the object 600. The camera 100 shows that, at time $T_1$, the object 600 is moving to the left in the drawing, as shown in the image 601. At time $T_2$, the object 600 is at rest, as shown in the image 602. However, at time $T_1$, the user is viewing the image 606 in which the object 600 is moving to the left in the drawing, and for this reason, performs an operation for moving the image capturing direction to the left, which causes an operation on the image 602 at time $T_2$ (communication 615). As a result, at time $T_2$, the camera 100 pans to the left although the object 600 is at the image center, as shown in image 602, and therefore, at time $T_3$, the object 600 is at the right, as shown in image 603. Furthermore, the image that the user views at time $T_2$ is the image 607 that has reached with a delay through the communication 611 of the image 601. Therefore, the user viewing the image 607 regards the object as still moving to the left and operates the controller 300 to further direct the camera 100 to the left. The communication 616 is control on the image 603, so that, at time $T_4$, the object 600 further moves to the right on the screen, as shown in image 604, although the object 600 is at rest from $T_2$ on. The user can finally confirm at time $T_3$ that the object 600 is at rest. However, depending on the response speed of the user, the communication 617 still contains some control. For this reason, at time $T_5$ at which all the control is completed, the object 600 moves significantly out of the screen center, as shown in the image 610. Thus, the large amount of communication delay between the camera 100 and the controller 300 makes it difficult for the user to perform the manual control operation.

The assisting operation of this embodiment reduces a decrease in the operation performance of the tracking operation by combining the control of the controller 300 and the control of the information processing apparatus 200.

In the basic operation, control of the camera 100 performed individually by the information processing apparatus 200 and the controller 300 is for the velocities and directions of the panning operation and the tilting operation. In the assisting operation of this embodiment, when the amount of communication delay between the controller 300 and the camera 100 is large, the pan/tilt operation of the camera 100 is performed on the basis of both the first control instruction from the controller 300 and the second control instruction from the information processing apparatus 200. Specifically, the velocities of the panning operation and the tilting operation are controlled by the information processing apparatus 200, and the directions of the panning operation and the tilting operation are controlled by the controller 300. In other words, the control command generated in step S105 in the process of the information processing apparatus 200 is a control command only for the velocities, and the control command generated in step S303 in the process of the controller 300 is a control command only for the directions. The camera 100 receives user's control for the directions with delay. However, the information processing apparatus 200 with a less delay in the transmission of control to the camera 100 takes on the velocity control so that the object 600 remains at the image center. Thus, the integrated control is performed.

The control command generating step in step S105 of the information processing apparatus 200 will be described with reference to FIGS. 7A to 7C and FIGS. 8A and 8B.

Figure 7B:
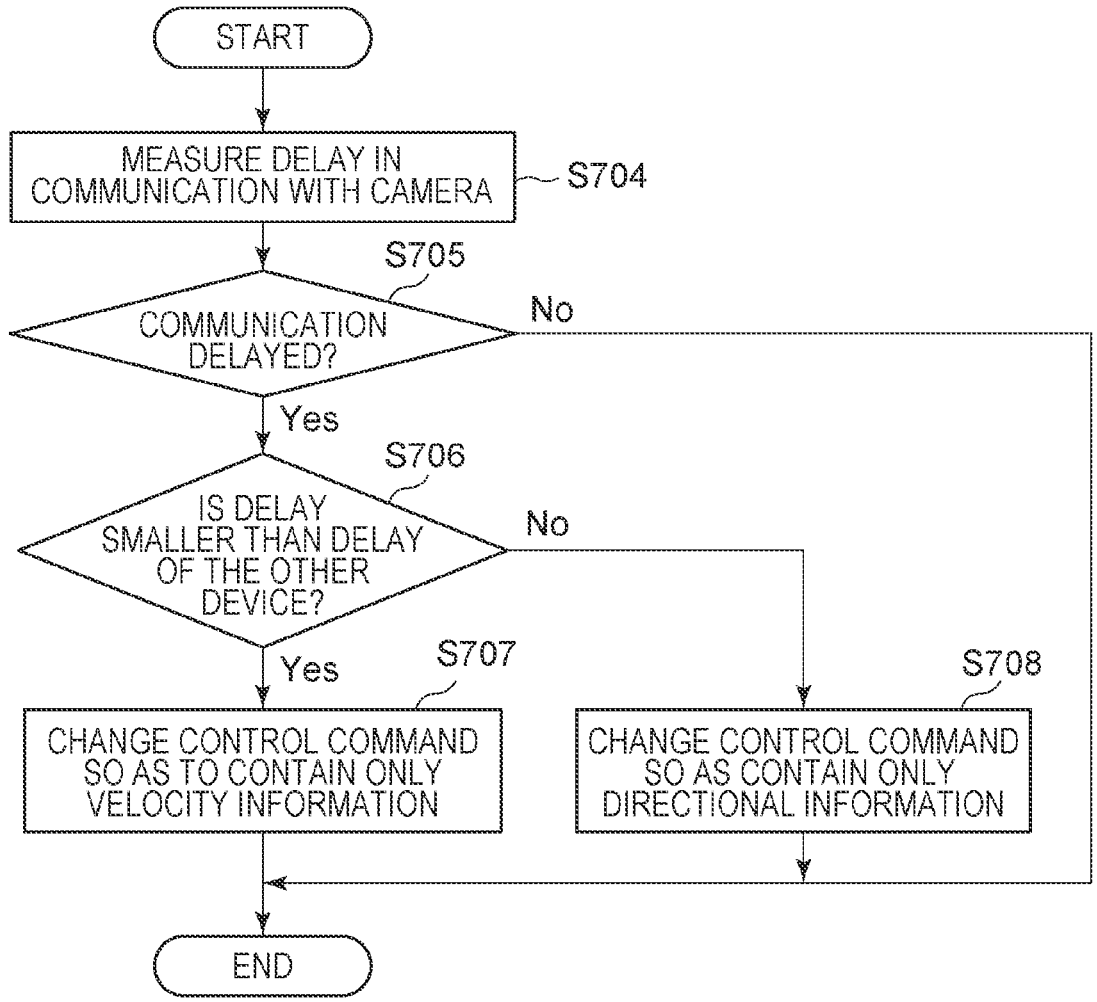

The control flowcharts shown in FIGS. 7A and 7B illustrate the details of step S105.

Figure 8A:
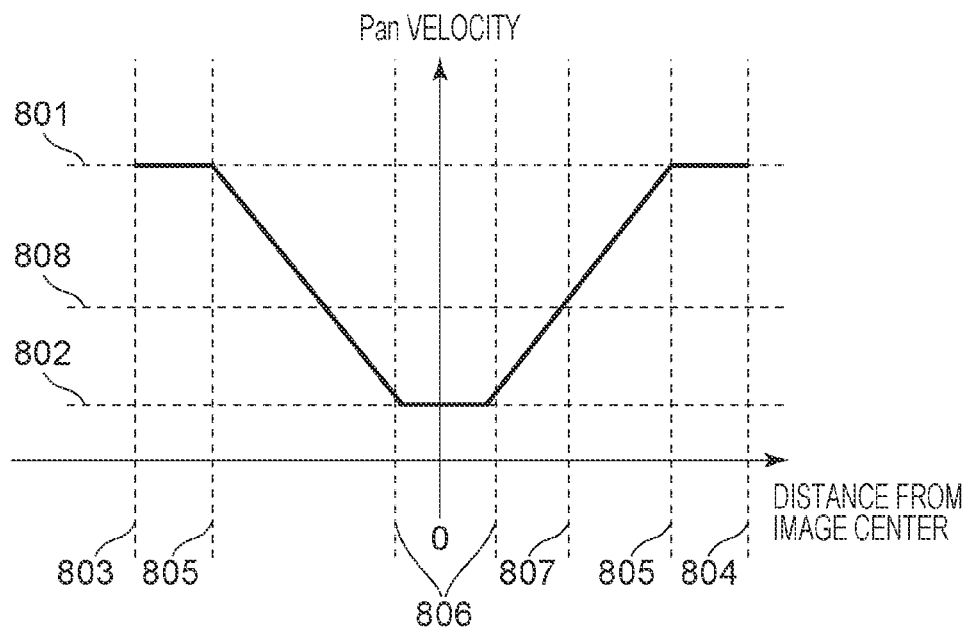
FIGS. 8A and 8B are graphs for illustrating determination of velocities with reference to the object position in the captured image.

At step S701, the CPU 201 reads a boundary position, which is a parameter for determining the velocity in the control command stored in the ROM 202. The boundary position is information about the positions at which the highest velocity and the lowest velocity of pan are reached, which will be described with reference to FIGS. 8A and 8B. FIG. 8A is a graph representing calculation for determining the angular velocity in the panning direction from the video received in step S102 and the inference stored in step S103. The vertical axis indicates the panning angular velocity, and the horizontal axis indicates the distance (the value in the x-coordinate) from the image center to the object position in the horizontal direction.

Figure 8B:
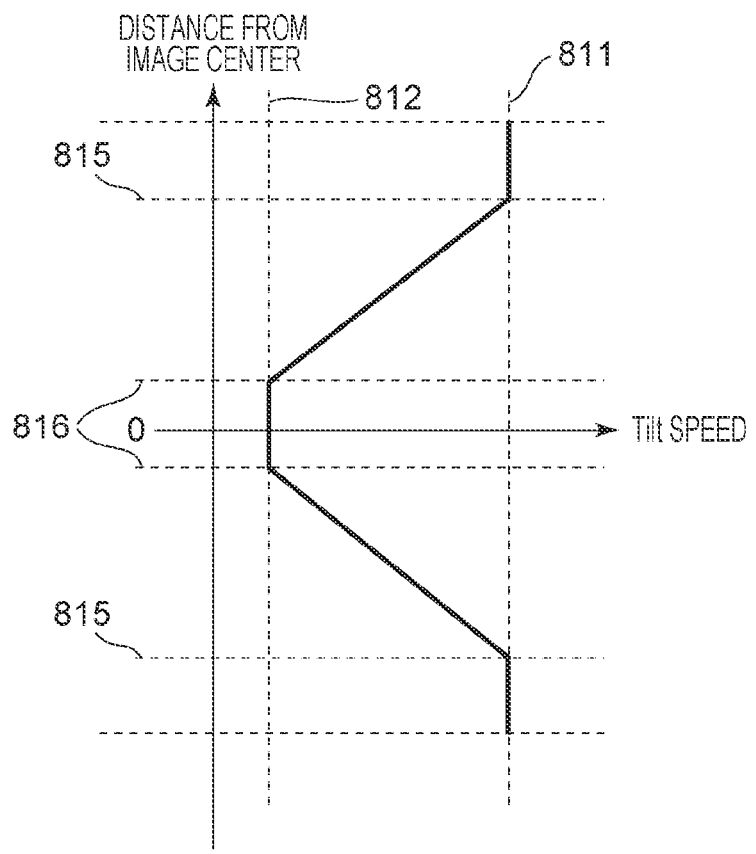

First, the highest velocity 801 and the lowest velocity 802 of the panning operation, obtained from the camera 100 in step S104, and the left end 803 and the right end 804 of the image width of the captured image received in step S102 in the coordinate system in which the image center in the horizontal direction is zero. The coordinates are relative values so as not to depend on the resolution. For example, the left end 803 is set at −1, and the right end 804 is set at +1. To capture the object at the image center, the pan driving velocity may be decreased as the object position in the horizontal direction is nearer to the image center, and may be increased as the object position is nearer to the outside (away from the image center). Accordingly, the distance 805 at which the panning highest velocity is reached is defined as the boundary position of the highest velocity, and the distance 806 at which the panning lowest velocity is maintained is defined as the boundary position of the lowest velocity, with the image center 0 as the origin. The panning velocity may be changed in any way from the highest velocity to the lowest velocity. In this case, the velocity may be linearly changed, according to the distance from the image center. FIG. 8B illustrates a case in which a similar process is performed for the vertical direction, that is, tilting. The process is the same as that in FIG. 8A except that the vertical axis indicates the distance (the value in the y-coordinate) from the image center to the object position, the horizontal axis indicates the tilting angular velocity, and the highest velocity 811 and the lowest velocity 812 are the possible highest velocity and lowest velocity for tilting, obtained from the camera 100, and a description thereof will be omitted. In this case, the boundary positions for the tilting operation are the distance 815 (highest velocity) and the distance 812 (lowest velocity).

In step S702, the information processing apparatus 200 calculates the driving directions and the driving velocities for the pan/tilt operation on the basis of the object position in the captured image and the boundary positions obtained in step S701. The CPU 201 reads the object position in the image from the inference stored in the RAM 203 in step S103. The coordinates indicating the barycentric position of the object are obtained as the object position, as described above. Next, the CPU 201 normalizes the obtained coordinates using the image width and height and calculates the distance from the image center to the object position. For example, if the distance in the horizontal direction is the distance 807 shown in FIG. 8A, the velocity 808 may be designated as the angular velocity for the panning operation. Similarly, the angular velocity for the tilting operation is also determined. Next, the CPU 201 determines a control command for direction. The CPU 201 determines a driving direction for the pan/tilt operation necessary for the object position to come close to the image center, laterally for panning and vertically for tilting, with the image center as the origin, and converts the driving direction to a control command and stores the command in the RAM 203.

In step S703, the CPU 201 performs an assisting process in which a communication delay is factored. In the assisting process, the process shown in FIG. 7B is performed. The details of the assisting process will be described with reference to FIG. 7B.

In step S704, the CPU 201 measures the amount of communication delay between the camera 100 and the information processing apparatus 200 via the network OF 204. Examples of the measuring method include, but not limited to, measuring the times from transmission of a control command to a response in a plurality of communications and then averaging the times and measuring a response to a control request containing a specific command. The measured amount of communication delay is transmitted to the camera 100 as connection information on the camera 100, and the CPU 101 of the camera 100 stores the amount of communication delay in the RAM 103 of the camera 100. Also in the case where another device other than the information processing apparatus 200 is controlling the camera 100, the amount of communication delay between the device and the camera 100 is stored in the camera 100, and the CPU 201 requests the camera 100 of the information. In this embodiment, the controller 300 controls the image capturing of the camera 100. For this reason, the amount of communication delay between the controller 300 and the camera 100 is also stored in the RAM 103 of the camera 100. This allows the CPU 201 of the information processing apparatus 200 to acquire the amount of communication delay between the controller 300 and the camera 100 from the CPU 101 of the camera 100 via the network OF 204. The CPU 201 can obtain the communication time between the information processing apparatus 200 and the camera 100 as a first communication delay amount $L_{PC}$ and the communication time between the controller 300 and the camera 100 as a second communication delay amount $L_{ctrl}$.

In step S705, the CPU 201 determines whether a communication delay on the system to be considered has occurred. First, the CPU 201 reads a delay determination threshold $L_T$ stored in the ROM 202. The value $L_T$ may be a fixed value or may be stored in the RAM 203 and dynamically switched according to the above-described measurement. If the difference between the first communication delay amount $L_{PC}$ and the second communication delay amount L ad is greater than the delay determination threshold $L_T$, it is determined that there is a communication delay on the system, and the process goes to step S706. If the difference is less than the delay determination threshold $L_T$, it is determined that there is no need to take the communication delay on the system into account, and the process ends and returns to the control process in FIG. 7A. In contrast, if there is a communication delay due to connection via the Internet 700, such as a case where the controller 300 is remote from the camera 100 or a case where a temporary communication load is placed, and the difference is greater than the delay determination threshold $L_T$, the process goes to step S706.

In step S706, the CPU 201 compares the first communication delay amount and the second communication delay amount obtained in step S703. If the first communication delay amount $L_{PC}<$ the second communication delay amount $L_{ctrl}$, the information processing apparatus 200 determines that the communication delay is less than that for the controller 300, and the process goes to step S707. Otherwise, the process goes to step S708. In this embodiment, the information processing apparatus 200 is connected to the camera 100 in the identical LAN 400, while the controller 300 is connected to the camera 100 via the Internet 700. Thus, basically, the relationship, the first communication delay amount $L_{PC}<$ the second communication delay amount $L_{ctrl}$, holds, and the process goes to step S707. For this reason, in the assisting process performed by the CPU 201, step S706 may be omitted, and if it is determined in step S705 that a communication delay needs to be taken into account, the process goes to step S707.

In step S707, the CPU 201 removes the information indicating the direction from the control command indicating the velocities and directions of the pan/tilt operation calculated and stored in the RAM 203 in step S702. This process changes the control command so as to contain only the information about the velocities of the pan/tilt operation. The changed control command is stored in the RAM 203 again.

Since, in this embodiment, the control command calculated and stored in the RAM 203 in step S702 is a control command indicating only the velocities and the directions of the pan/tilt operation, the control command in this step indicates only the velocities. However, if the control command contains another information, the changed control command may contain the information.

In step S708, the CPU 201 removes information indicating the velocities from the control command indicating the velocities and the directions of the pan/tilt operation calculated and stored in the RAM 203 in step S702. This changes the control command so as to contain only the information about the directions of the pan/tilt operation. The changed control command is stored in the RAM 203 again.

Thus, if the amount of communication delay between the information processing apparatus 200 and the camera 100 is less than the amount of communication delay between the controller 300 and the camera 100, the information processing apparatus 200 transmits the driving velocities of the pan/tilt operation to the camera 100 as the second control instruction. In contrast, if the amount of communication delay between the information processing apparatus 200 and the camera 100 is greater than the amount of communication delay between the controller 300 and the camera 100, the information processing apparatus 200 transmits the driving directions of the pan/tilt operation to the camera 100 as the second control instruction. If the difference between the first communication delay amount and the second communication delay amount is less than or equal to the delay determination threshold, the information processing apparatus 200 transmits a control command containing both the information on the driving velocities and the information on the driving directions to the camera 100 as the second control instruction.

In the assist mode, if the difference between the first communication delay amount and the second communication delay amount is less than or equal to the delay determination threshold, the second control instruction need not be transmitted.

Figure 7C:
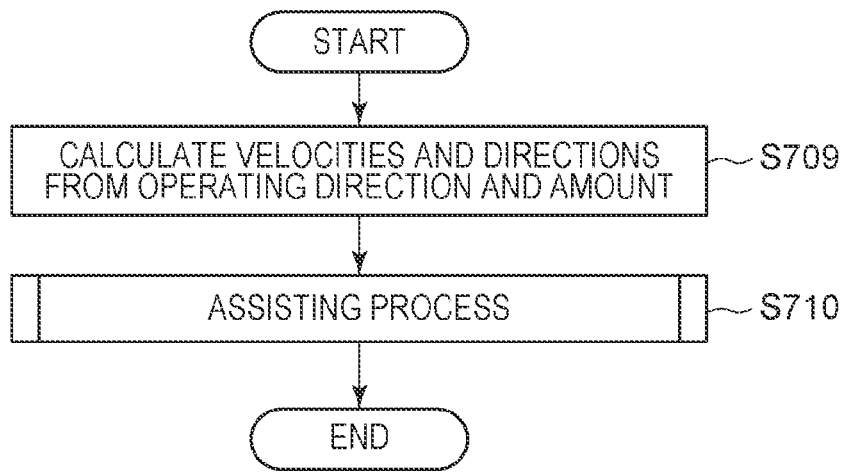

Next, the control command generation step S303 of the controller 300 will be described with reference to FIGS. 7C and 7B. In step S709 of FIG. 7C, the CPU 301 calculates the driving directions and the driving velocities (angular velocities) of the pan/tilt operation on the basis of the operating direction and amount of the joystick. The process goes to step S710, in which the assisting process in FIG. 7B is performed. The processes from step S704 to step S708 are the same as those of the information processing apparatus 200, and detailed descriptions thereof will be omitted. The information processing apparatus 200 is connected to the camera 100 in the identical LAN 400, while the controller 300 is connected to the camera 100 via the Internet 700, as described above. For this reason, basically, the first communication delay amount $L_{PC}<$ the second communication delay amount $L_{ctrl}$ holds, and the process goes from step S706 to step S708. Accordingly, in the assisting process performed by the CPU 301, step S706 may be omitted, and if it is determined in step S705 that a communication delay needs to be taken into account, the process goes to step S708.

Thus, if the amount of communication delay between the controller 300 and the camera 100 is less than the amount of communication delay between the information processing apparatus 200 and the camera 100, the controller 300 transmits the driving velocities of the pan/tilt operation to the camera 100 as the first control instruction. If the amount of communication delay between the controller 300 and the camera 100 is greater than the amount of communication delay between the information processing apparatus 200 and the camera 100, the controller 300 transmits the driving directions of the pan/tilt operation to the camera 100 as the first control instruction.

If the difference between the first communication delay amount $L_{PC}$ and the second communication delay amount $L_{ctrl}$ is less than or equal to the delay determination threshold $L_T$, both the first control instruction and the second control instruction contain both the information on the driving velocities and the information on the driving directions of the pan/tilt operation. In this case, if the manual control operation mode is set, the camera 100 gives priority to the first control instruction for the pan/tilt operation even if the assist mode is set. Control of an image capturing process other than the pan/tilt operation, such as the start/stop of video recording, is also performed according the control of the controller 300.

Figure 9:
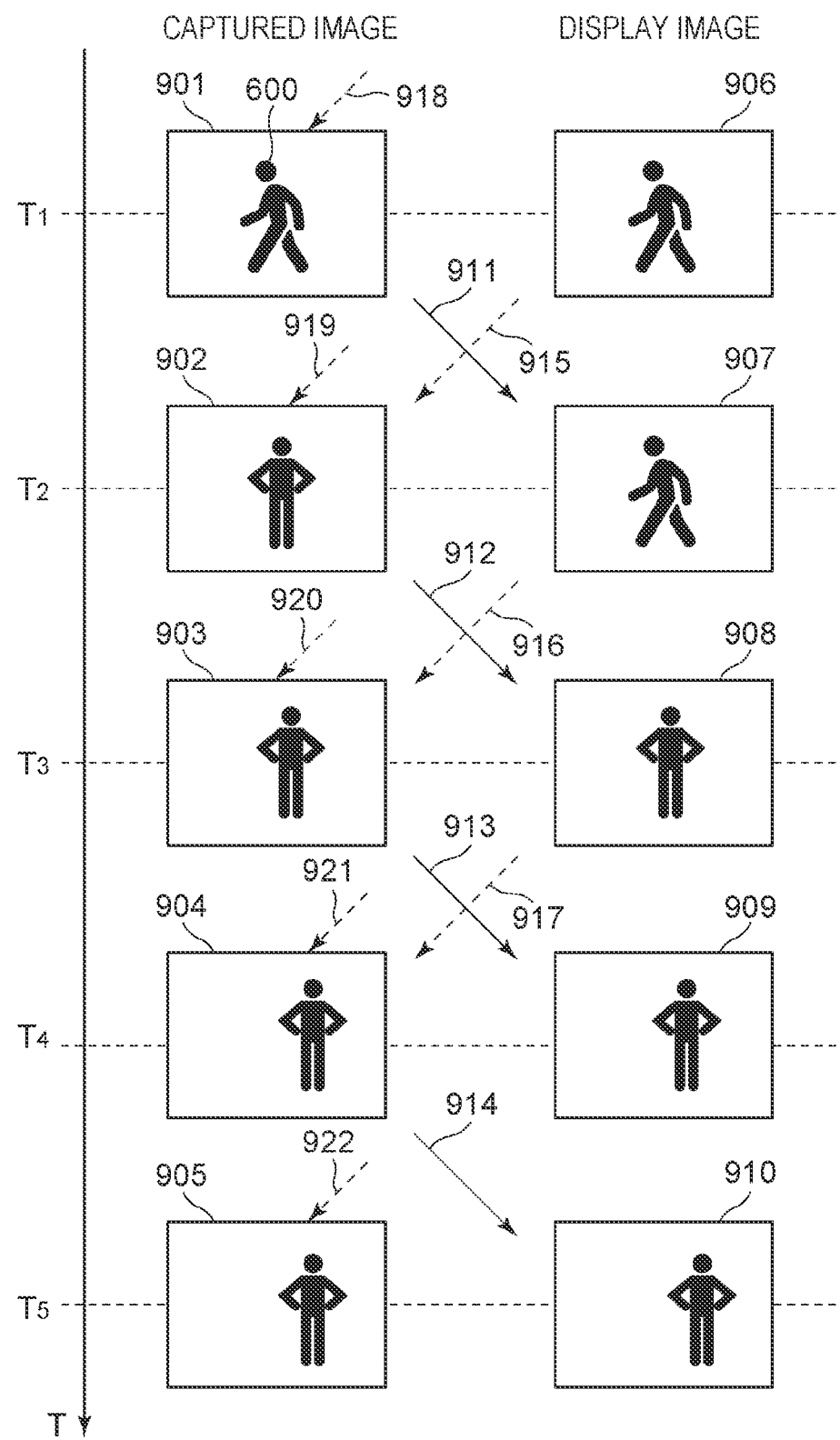
FIG. 9 is a diagram illustrating an operation when the first embodiment is applied.

Images captured when the assisting operation is applied will be described with reference to FIG. 9. The image 601 to the communication 614 in FIG. 6 and an image 901 to communication 914 in FIG. 9 correspond, respectively. For communications 915 to 917, the first control instruction contains no velocity information but only driving direction information, unlike the communications 615 to 617 shown in FIG. 6. In other words, even if the user wants to increase the velocity using a joystick or the like, the information is not transmitted to the camera 100. Transmission of the second control instruction from the information processing apparatus 200 to the camera 100 is expressed as communications 918 to 922. The second control instruction contains information on the driving velocities of the pan/tilt operation. The information processing apparatus 200 always performs velocity control according to the images received from the camera 100 and an inferred object position.

Suppose that the object 600 stops at time $T_2$ as in the image 902, as in the case described with reference to FIG. 6. In FIG. 6, since the communication 615 is transmitted at time $T_1$, the object 600 moves at time $T_3$. However, in FIG. 9, the communication 915 (first control instruction) contains only the information about the driving directions, and the driving velocities are controlled by the communication 919 (second control instruction), so that the object 600 does not move significantly at time $T_3$, as shown in the image 903.

Thus, the information processing apparatus 200 assists the manual control operation. This provides the effect of enabling the camera 100 to be controlled according to the motion of the object 600 using the manual operation even if the communication delay between the controller 300 and the camera 100 is large.

Although the determination of the velocities is made according to the image center and the position of the object 600, the velocities at the individual times may be stored, and when the object 600 stops or starts suddenly, the velocities may be corrected according to the position. In other words, when sudden stop is detected, the velocities may be switched, not to the lowest velocity, but to operation stop, and on sudden start, the velocities may be instantly switched to the highest velocity.

The first and second communication delay amounts are measured between the information processing apparatus 200 and the camera 100 and between the controller 300 and the camera 100, respectively. The first and second communication delay amounts are integrated to the camera 100. However, another method for obtaining the communication delay amounts may be adopted. For example, the information processing apparatus 200 may measure the amount of communication delay with the controller 300 and transmit the amount to the camera 100. The difference between the first communication delay amount and the second communication delay amount is the amount of delay on the Internet line caused by the connection of the controller 300 with the camera 100 via the Internet. Accordingly, the amount of delay corresponding to the difference between the first communication delay amount and the second communication delay amount may be obtained by measuring the amount of communication delay between the information processing apparatus 200 and the controller 300 connected via the Internet.

When the manual control operation mode with the assisting operation at OFF is selected as a tracking mode, the information processing apparatus 200 is not involved with the pan/tilt operation of the camera 100, so that the process in FIG. 3 may be stopped. In this case, the processes shown in FIGS. 7A to 7C are also stopped.

Even with the assist mode at ON, when the difference between the first communication delay amount $L_{PC}$ and the second communication delay amount $L_{crtl}$ is less than or equal to the delay determination threshold $L_T$, the information processing apparatus 200 is not involved with the pan/tilt operation of the camera 100. For this reason, when the difference between the first communication delay amount $L_{PC}$ and the second communication delay amount $L_{crtl}$ is less than or equal to the delay determination threshold $L_T$ in step S705, the information processing apparatus 200 may not have to transmit the second control instruction.

Although the tracking operation is performed to keep the object 600 at the image center, this is given for mere illustrative purposes. The user may designate the position where the object is to be kept, or the information processing apparatus 200 may automatically set a position other than the center as a position where the object is to be kept, depending on the object type or the background.

In this embodiment, it is determined whether to take the communication delay into account by measuring the first and second communication delay amounts and comparing the difference with a threshold. However, this process may be omitted in the case of a system configuration in which some degree of communication delay that needs to be taken into account can occur, such as when the distance between the camera 100 and the controller 300 is significantly large (for example, communication with foreign countries) or when the communication amount is large. For example, the assisting process (S703) performed by the information processing apparatus 200 may contain only step S707, and the assisting process (S710) performed by the controller 300 connected to the camera 100 via the Internet 700 may contain only step S708. For example, when the user determines that some degree of communication delay may occur between the controller 300 and the camera 100 because of the system configuration or the scene, the user enables the assisting operation. In response, the information processing apparatus 200 may perform step S707 without measuring the communication time, and the controller 300 may perform step S708 without measuring the communication time. A selecting unit for enabling the assisting operation may be disposed at any position on the system that the user can operate. The user who performs the operation to enable the assisting operation may be another user different from a user who operates the joystick or the like of the controller 300 to perform the pan/tilt operation.

Second Embodiment

In the first embodiment, the information processing apparatus 200 determines the driving velocities and the driving directions of the pan/tilt operation according to the image center and the object position. This embodiment differs from the first embodiment in that the amount of movement of the object is calculated, not as the distance in the image, but as the angle from the camera 100. The second embodiment differs from the first embodiment in the control command generating method (S105) performed by the information processing apparatus 200 but basically similar in the operation process other than the system configuration and step S105. For this reason, step S105 will be described, and descriptions of the other will be omitted.

The details of the control command generating method (S105) performed by the information processing apparatus 200 will be described with reference to FIG. 10, FIGS. 11A to 11C, and FIGS. 12A to 12C. The process shown in FIG. 10 corresponds to the process of FIG. 7A in the first embodiment, and the process shown in FIG. 10 is performed instead of the process in FIG. 7A. In step S1001, the information processing apparatus 200 calculates an angle necessary for turning to the object (that is, an angle for capturing the object at the image center) from the inference of the object position. The CPU 201 reads the object position in the image from the inference stored in the RAM 203 in step S103. The coordinates indicating the barycentric position of the object are obtained, as described above.

Referring to FIGS. 11A to 11C and FIGS. 12A to 12C, a method for calculating the angle to the object direction as seen from the camera 100 will be described using the coordinates indicating the barycentric position of the object and the parameters obtained from the camera 100.

Figure 11B:
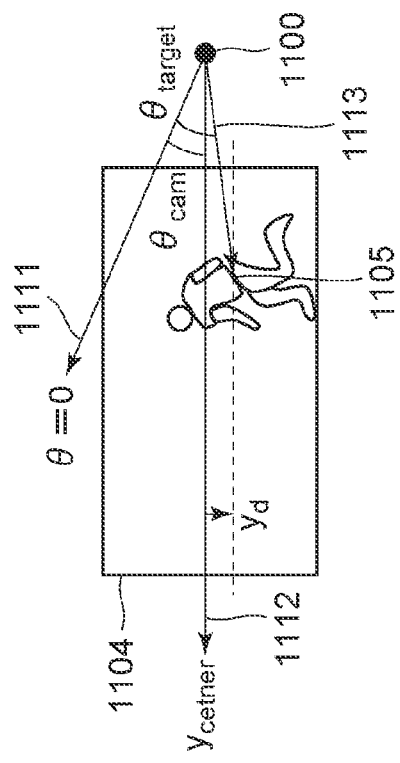
FIGS. 11A to 11C are diagrams illustrating velocity determination with reference to the coordinates of the object in the real world in the second embodiment.
Figure 11C:
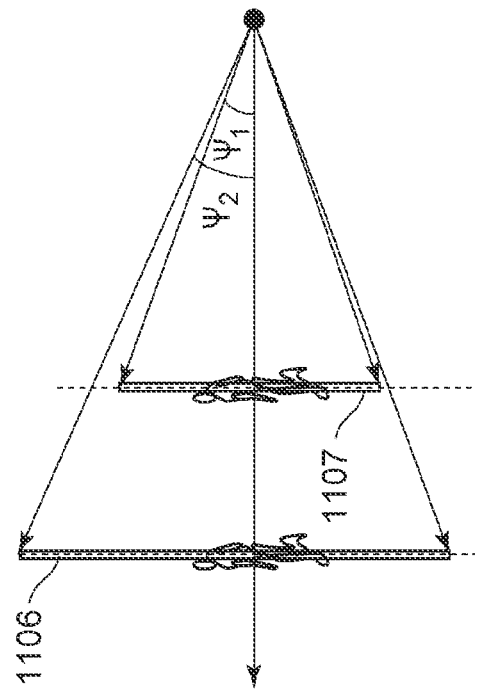
Figure 11A:
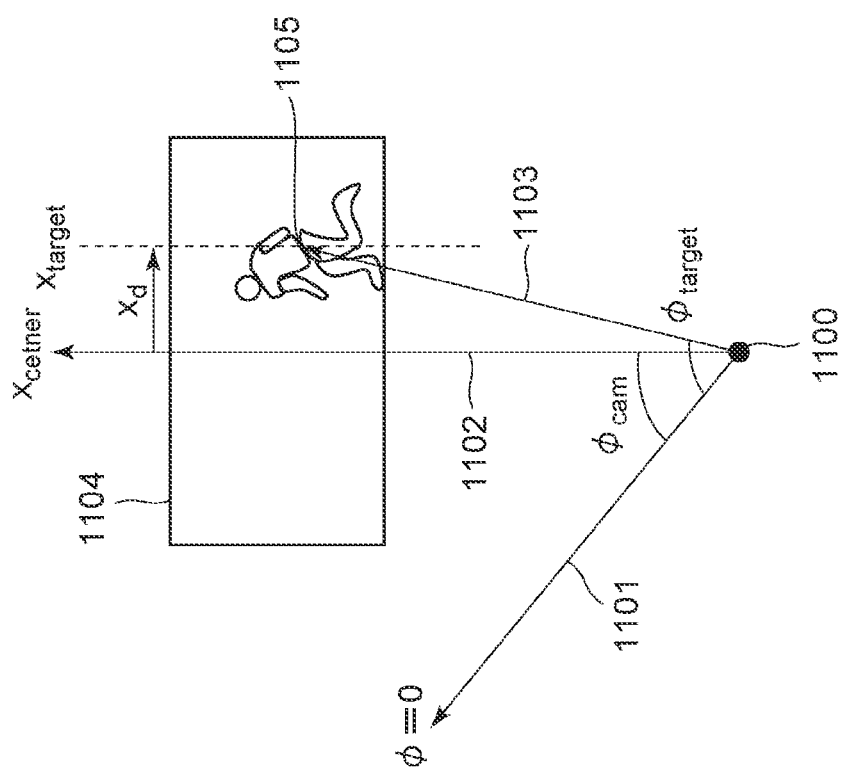

FIG. 11A is a diagram illustrating the positional relationship between the camera 100 and the object in the real world, in which the horizontal direction, that is, the pan direction, is focused on. The camera 100 is at a position 1100. The direction in which the panning angle is zero is represented as a reference direction 1101, the direction in which the camera 100 faces is represented as an image capturing direction 1102, and the direction indicating the object position seen from the camera 100 is represented as an object direction 1103. The range that the camera 100 is imaging is represented as an area 1104, and the barycentric position of the object is represented as object coordinates 1105. The angle that the reference direction 1101 and the image capturing direction 1102 form is represented as $\phi_{cam}$, and the angle that the reference direction 1101 and the object direction 1103 form is represented as $\phi_{target}$. Controlling the camera 100 so that the angle $\phi_{cam}$ becomes $\phi_{target}$ enables the object to be disposed at the image center. In the captured image, the distance $x_d$ to $x_{target}$ indicating the coordinates 1105 in the coordinate system in which the image center $x_{center}$ is zero is obtained. FIG. 11B is a diagram in which the vertical direction, that is, the tilt direction, is focused on. As in FIG. 11A, the direction in which the tilting angle is zero is represented as a reference direction 1111, the direction in which the camera 100 actually faces is represented as an image capturing direction 1112, and the direction indicating the object position seen from the camera 100 is represented as an object direction 1113. The angle that the reference direction 1111 and the image capturing direction 1112 form is represented as $\theta_{cam}$, and the angle that the reference direction 1101 and the object direction 1103 form is represented as $\theta_{target}$. As for the panning direction, controlling the camera 100 so that the angle $\theta_{cam}$ becomes $\theta_{target}$ enables the object to be disposed at the image center. In the captured image, the distance $y_d$ to $y_{target}$ indicating the coordinates 1105 in the coordinate system in which the image center $y_{center}$ is zero is obtained. FIG. 11C shows a change in the angle of view due to a change in zoom magnification, where $\Psi_2$ is a zooming angle of view at a zoom position 1106 and $\Psi_1$ is a zooming angle of view at another zoom position 1107. If the zooming angle of view obtained from the camera 100 is the horizontal direction, the vertical zooming angle of view can be calculated using the aspect ratio of the image. In this embodiment, the control information on the camera 100, obtained in step S104, contains the current panning angle $\phi_{cam}$ and tilting angle $\theta_{cam}$, and zooming angle of view $\Psi_{cam}$, which are stored in the RAM 203.

Figure 12A:
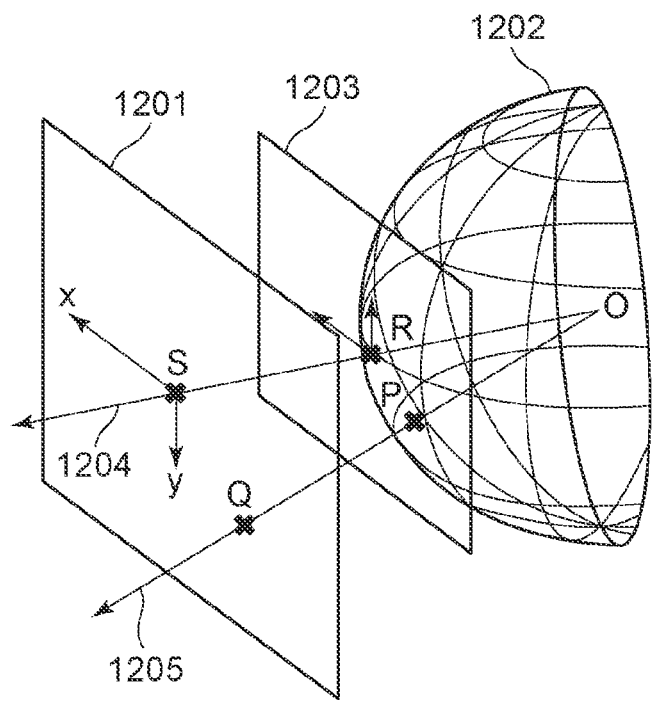
FIGS. 12A to 12C are diagrams illustrating an example of calculation of the coordinates in the real world.
Figure 12B:
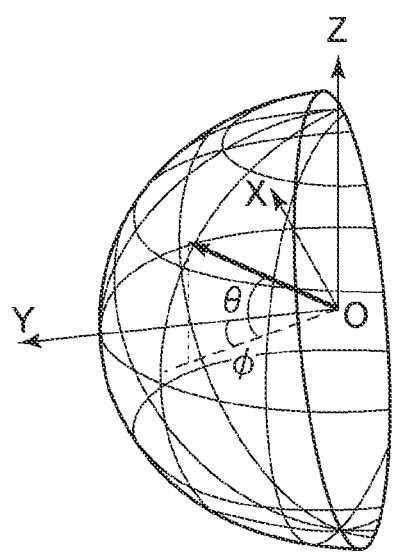
Figure 12C:
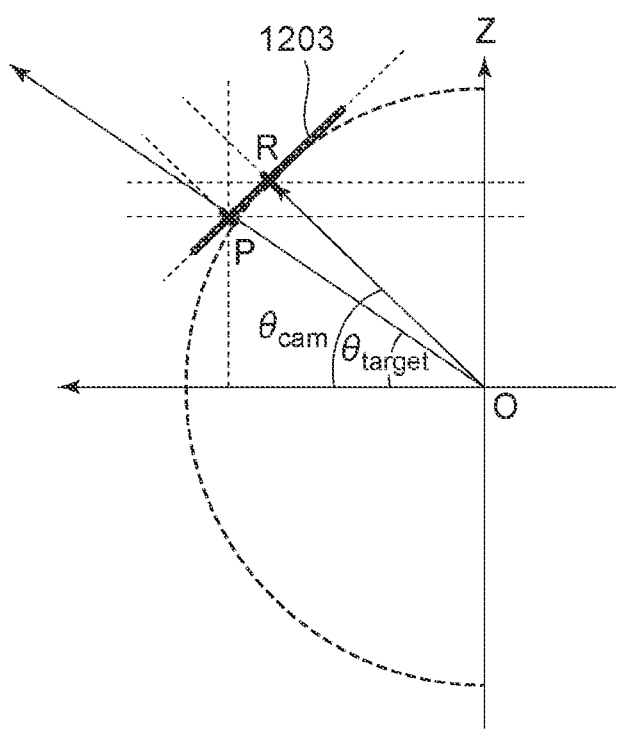

Referring next to FIGS. 12A to 12C, the object position converted to the coordinates on the spherical lens surface is calculated. An area 1201 in FIG. 12A corresponds to the area 1104 in FIG. 11A, which indicates a range that the camera 100 is imaging, in which the area center is represented as S, and the object position is represented as Q. For ease of calculation, a virtual spherical surface 1202 of the lens of the camera 100 is used for description. The spherical surface 1202 of the lens is a unit spherical surface with the center at the point of view O, and the distance at 1. The calculation is performed using an area 1203 obtained by translating the area 1201 toward the point of view O into contact with the spherical surface 1202. The area center S moves to an area center R with the movement, and the area center R comes into contact with the spherical surface 1202. The object position Q goes to an object position P. The area center S and the area center R are on a line of sight (image capturing direction) 1204, and the object position Q and the object position P are on the same straight line indicated by a line of sight (image capturing direction) 1205 as seen from the point of view O. The movement to the lens spherical surface causes the distances $x_d$ and $y_d$ to change according to the zooming angle of view $\Psi_{cam}$. For this reason, normalization based on the zooming angle of view $\Psi_{cam}$, described with reference to FIG. 11C, is performed. Thus, the coordinates $(X_{pr}, y_{pr})$ of the object position P on the area 1203 in the plane coordinate system are obtained.

Next, the coordinates of the object position P in the coordinate system with the point of view O at the origin, shown in FIG. 12B, are obtained from the plane coordinate system on the area 1203, where $\phi$ is the angle formed by the X-axis and the Y-axis, and $\theta$ is the angle formed by the Y-axis and the Z-axis, which correspond to the panning angle and the tilting angle, respectively, to which the values $\phi_{cam}$ and $\theta_{cam}$ described with reference to FIGS. 11A to 11C can be applied, respectively. FIG. 12C is a cross section of FIG. 12A taken along a plane passing through the area center R and the origin and formed by the angle 4. If the coordinates $(x_{po}, y_{po}, z_{po})$ of the object position P is found, the panning angle $\phi_{target}$ and the tilting angle $\theta_{target}$ are found. The panning angle $\phi_{target}$ and the tilting angle $\theta_{target}$ can be calculated from the information obtained above, $(x_{pr}, y_{pr})$, the radius 1 of the unit spherical surface, and $\phi_{cam}$, and $\theta_{cam}$.

$$x_{po} = \cos\phi_{cam}*\cos\theta_{cam}*x_{pr} - \sin\phi_{cam}*y_{pr} - \cos\phi_{cam}*\sin\theta_{cam}*z_{pr}$$

$$y_{po} = \sin\phi_{cam}*\cos\theta_{cam}*x_{pr} + \cos\phi_{cam}*y_{pr} - \sin\phi_{cam}*\sin\theta_{cam}*z_{pr}$$

$$z_{po} = \sin\theta_{cam}*x_{pr} + \cos\theta_{cam}*z_p$$

The panning angle $\phi_{target}$ and the tilting angle $\theta_{target}$ are calculated from the found coordinates $(x_{po}, y_{po}, z_{po})$ of the object position P.

$$\phi_{target} = \tan^{-1}(y_{po}/x_{po})$$

$$\theta_{target} = \tan^{-1}\left(z_{po}/\sqrt{x_{po}^2 + y_{po}^2}\right)$$

Thus, the angle of the object in the direction of the barycentric position (object direction) seen from the camera 100 can be calculated using the coordinates $(x_{po}, y_{po}, z_{po})$ indicating the barycentric position of the object. The CPU 201 stores the calculated $\phi_{target}$ and $\theta_{target}$ into the RAM 203. Here is a description of a method for calculating the angle in the object direction of one captured image. The CPU 201 also stores the calculation results of the angle in the object direction of past images in the RAM 203. In this embodiment, only a calculation result for one previously acquired image is stored. However, this is illustrative only.

In step S1002, the CPU 201 calculates angular velocities in the pan/tilt operation for actually controlling the camera 100 from $\phi_{target}$ and $\theta_{target}$ calculated in step S1001, and the frame rate of the video. The CPU 201 takes the difference between the angle of the current object direction, calculated in step S1001, and the past object direction. Here, the elapsed time between the images is obtained according to the frame rate of the images captured by the camera 100 via the video input I/F 208 in step S102. The angular velocity at which the object moves can be obtained by dividing the difference between the angles by the elapsed time. The angular velocity at which the object moves is used as the driving velocity (angular velocity) of the pan/tilt operation of the camera 100. Since the direction of the object is determined from the relationship between the reference direction and the object direction, the driving direction can also be similarly determined. The CPU 201 converts the obtained driving angular velocity and driving direction to a control command for controlling the camera 100 and stores the control command in the RAM 203.

In step S1003, the CPU 201 performs an assisting process according to the communication delay, described with reference to FIG. 7B, stores the control command in the RAM 203, and returns to step S106. Also in this embodiment, if the second communication delay amount is significantly larger than the first communication delay amount by the delay determination threshold $L_T$, the CPU 201 converts the second control instruction to information containing only the velocities, stores the information in the RAM 203, and, in step S106, transmits the information to the camera 100.

Thus, the object position can be calculated as an angle seen from the camera 100. This allows tracking control by calculating the pan/tilt angular velocity according to the obtained angular velocity of the object.

For example, if the object is sufficiently close to the image center, the object can be held at the image center by equalizing the angular velocity of the object to the pan (or tilt) angular velocity. Even if the object is at a position away from the image center, similar control allows tracking control with the position of the object on the image kept. If the object at a position away from the image center is to be moved to the image center, the pan (or tilt) direction and the angular velocity are determined so that the difference between the angle in the object direction and the angle in the image capturing direction decreases (to zero or within a predetermined range). Switching the process to the above-described process after the object is determined to be disposed at the image center allows the object to be held at the image center. Also in this embodiment, with the assisting process as in FIG. 7B, if a communication delay via the Internet larger than the threshold occurs in the assisted manual control mode, the information processing apparatus 200 does not control the driving direction. For this reason, the configuration of the information processing apparatus 200 may be changed so as to control also the directions only when the object at a position away from the image center is moved to the image center. This allows, even if tracking is started from a state in which the object is not positioned at the image center, the object to be kept at the image center.

Third Embodiment

In the first and second embodiments, in the case where the assisting operation is enabled, and the difference between the first and second communication delay amounts is greater than the delay determination threshold, the information processing apparatus 200 and the controller 300 individually transmit a control instruction containing the driving velocities and directions to the camera 100. Alternatively, the information processing apparatus 200 may receive a process from the controller 300, integrate the first and second control instructions to generate a third control instruction, and transmit the third control instruction to the camera 100.

This embodiment differs from the first and second embodiments in that, in the control instruction generating step S303, the controller 300 does not perform the assisting process shown in FIG. 7B, and that the destination of the first control instruction is not the camera 100 but the information processing apparatus 200.

Figure 13:
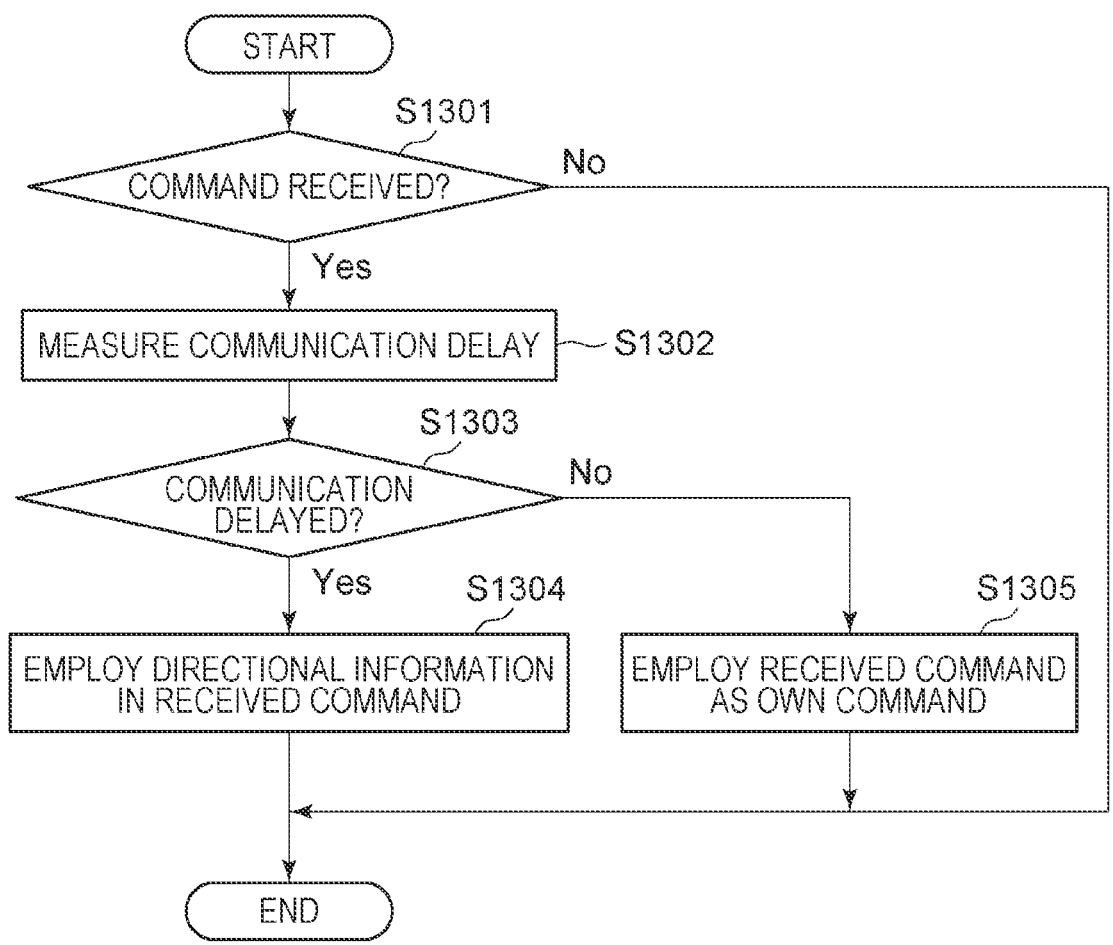
FIG. 13 is a flowchart for an assisting operation in a third embodiment.

The assisting process of this embodiment performed by the information processing apparatus 200 will be described in detail. This embodiment differs from the first and second embodiments in that the control process shown in FIG. 13 is performed in place of the control process shown in FIG. 7B or the first and second embodiments, and the control process in FIG. 13 will be described.

In step S1301, the CPU 201 determines whether the first control instruction has been received from the controller 300 via the network I/F 204. If the first control instruction has been received, the first control instruction is stored in the RAM 203, and the process goes to step S1302, otherwise, this control process ends. If the process is to be ended, the second control instruction containing both the driving velocities and the driving directions is transmitted to the camera 100.

In step S1302, the CPU 201 measures the amount of communication delay between the camera 100 and the controller 300 via the network IF 204. Examples of the measuring method include, but not limited to, measuring the times from transmission of a control command to a response in all the communications and then averaging the times and measuring a response to a control request containing a specific command. The measured amount of communication delay is stored in the RAM 203 as the communication delay amount $L_{PC}$ between the information processing apparatus 200 and the camera 100. Similarly, the communication delay amount $L_c$td between the information processing apparatus 200 and the controller 300 is measured and stored in the RAM 203. The communication delay may be measured every time the first control instruction is received, or alternatively, may be measured only at the first time or at regular intervals in consideration of a communication load.

In step S1303, the CPU 201 determines whether to take the communication delay on the system into account, as in step S705. First, the CPU 201 reads the delay determination threshold $L_T$ stored in the ROM 202. The value $L_T$ may be a fixed value or may be stored in the RAM 203 and dynamically switched according to the measurement. If the difference between $L_{PC}$ and $L_{ctrl}$ is greater than $L_T$, it is determined that there is some degree of communication delay that needs to be taken into account, and the process goes to step S1304. If the difference is less than $L_T$, it is determined that there is no need to take the communication delay on the system into account, and the process goes to step S1305.

In step S1304, the CPU 201 reads the first control instruction received from the controller 300 and stored in the RAM 203 and extracts data about the directions contained in the control instruction. The CPU 201 further reads its own control command (the second control instruction) stored in the RAM 203 and replaces the information on the driving directions contained in the second control instruction with information on the directions extracted from the first control instruction to update the control command. The updated control command is stored in the RAM 203 again as a third control instruction. This operation allows the control command produced on the basis of the information on the driving directions generated by the controller 300 and the information on the driving velocities generated by the information processing apparatus 200 to be transmitted to the camera 100. In the first or second embodiment, the control command (the first control instruction) containing the information on the driving directions and the control command (the second control instruction) containing the information on the driving velocities are transmitted to the camera 100 as different information. In this embodiment, one control command (the third control instruction) is transmitted to the camera 100.

In step S1305, the CPU 201 reads the control command received from the controller 300 from the RAM 203 and replaces the control command with its own control command to update it.

In other words, the control command that the information processing apparatus 200 transmits in the following control process is replaced with the control command received from the controller 300, which is synonymous with control of the camera 100 with the controller 300.

This provides a configuration in which a combination of the information indicating the driving velocities in the control command of the information processing apparatus 200 and the information indicating the driving directions in the control command of the controller 300 is employed as a control command to the camera 100 while taking a communication delay into account.

When the object stops suddenly, the user changes the process of step S1304 according to the time taken for the user to recognize the motion of the object due to communication delay, thereby increasing the effect of tracking. The user's operation on the image 902 shown at time $T_2$ in FIG. 9 is the communication 917 operated by the user after the user views the image 908 and received at time $T_4$. In other words, the period from time $T_2$ to time $T_4$ can be regarded as the effect of communication delay. Therefore, the period from time $T_2$ to time $T_4$ is recorded on the RAM 203 as an operation extension time. In step S702, timing is started from the time when the CPU 201 determines the velocity to be zero, that is, the object to have stopped, and in step S1304, the CPU 201 ignores the control command (the first control instruction) received before the elapse of the operation extension period. This allows control of the information processing apparatus 200 to be given priority, allowing tracking following the motion of the object. Not at the stop of the object, but when there is a difference between the second control instruction calculated from the image and the first control instruction according to the user's operation, the calculated first control instruction may be given priority according to the operation extension period.

In this embodiment, the information processing apparatus 200 combines the generated second control instruction and the received first control instruction to generate the third control instruction and transmits the third control instruction to the camera 100. Alternatively, the third control instruction may be generated by another apparatus in the LAN 400. The information processing apparatus 200 transmits the second control instruction, and the controller 300 transmits the first control instruction to the camera 100. The camera 100, which has received the first control instruction and the second control instruction, performs the assisting process shown in FIG. 7B. In other words, if the difference between the first communication time and the second communication time is greater than a threshold, information on the driving velocities contained in the second control instruction and information on the driving directions contained in the first control instruction are combined to generate the third control instruction, and the pan/tilt operation is controlled on the basis of the third control instruction.

Fourth Embodiment

In the first to third embodiments, the information processing apparatus 200 makes an inference from the images to specify the object position and performs velocity control. In embodiment, a system configured to perform a similar process without the information processing apparatus 200 using the camera 100 having a similar function will be described.

Figure 14:
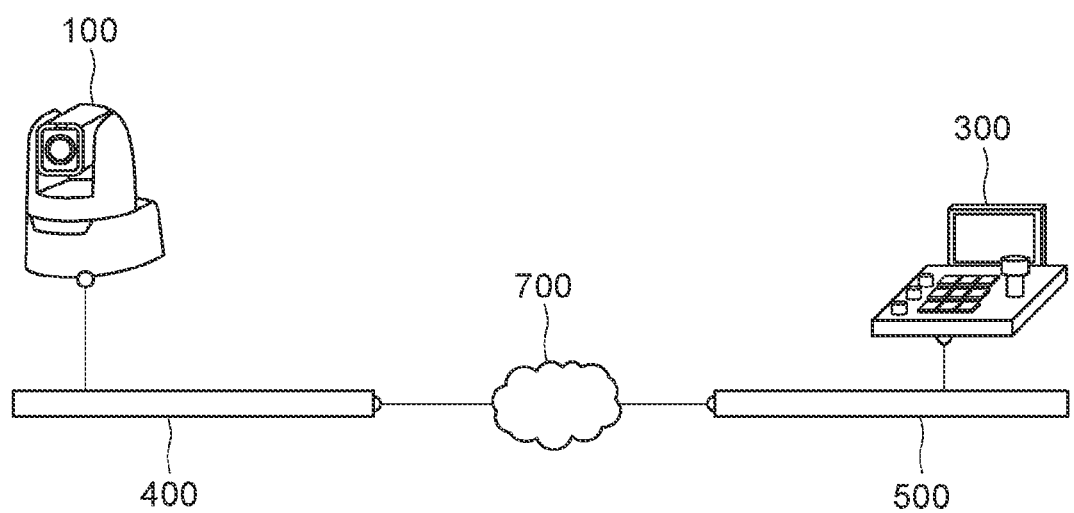
FIG. 14 is a diagram illustrating an example of an entire system of a fourth embodiment.
Figure 15:
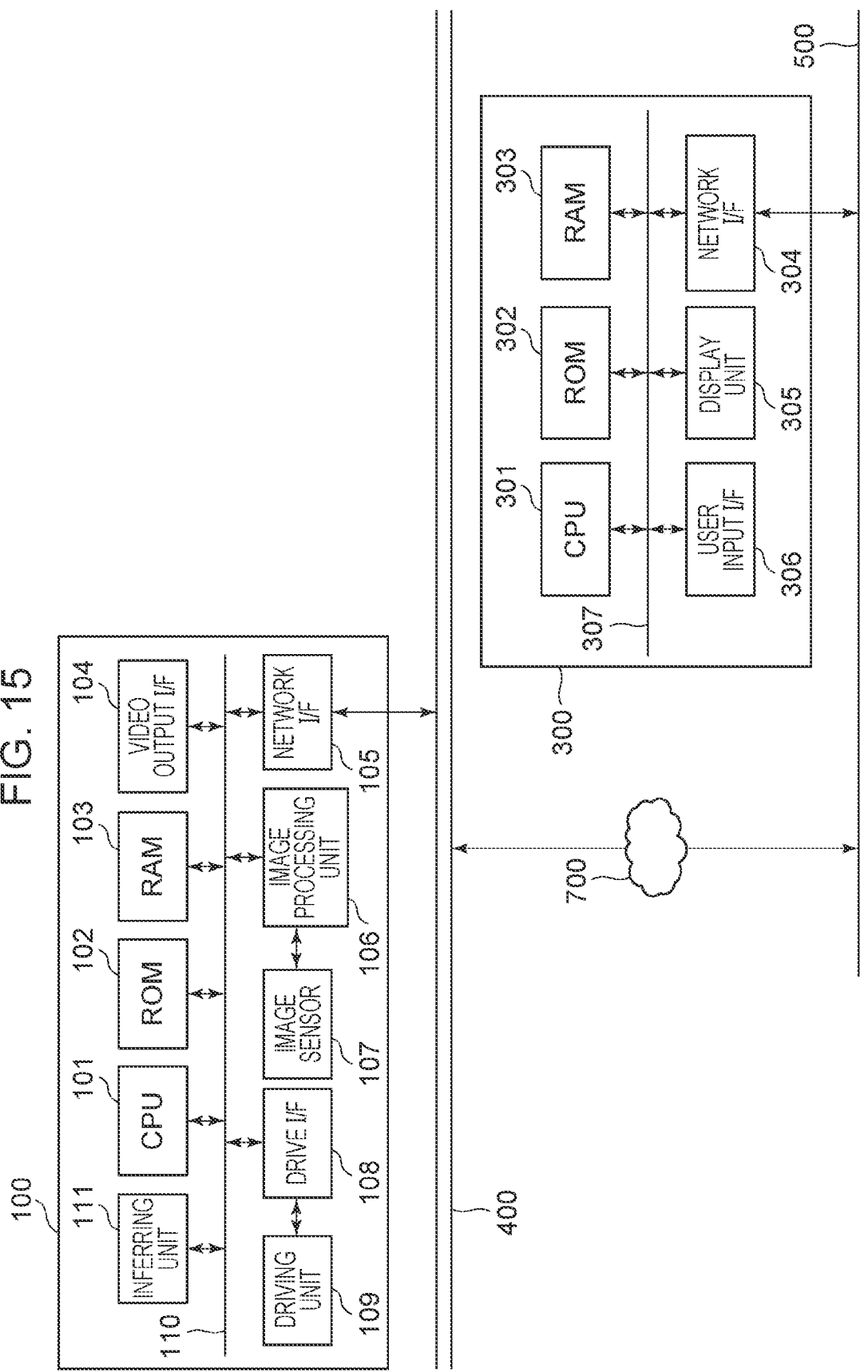
FIG. 15 is a diagram illustrating the hardware configuration of the system in the fourth embodiment.

FIG. 14 is a diagram illustrating an example of a system configuration for the process according to this embodiment. FIG. 15 is a hardware configuration diagram of the camera 100 and the controller 300 constituting the system. The fourth embodiment differs from FIG. 2 in that the camera 100 includes an inferring unit 111 but is the same as FIG. 2 in the other, and a detailed description will be omitted.

The controller 300 of this embodiment performs a process similar to the third embodiment but differs from the third embodiment in that the destination of the first control instruction is the camera 100. In other words, the fourth embodiment differs from the first and second embodiments in that the assisting process shown in FIG. 7B is not performed in the control instruction generating step S303.

Figure 16:
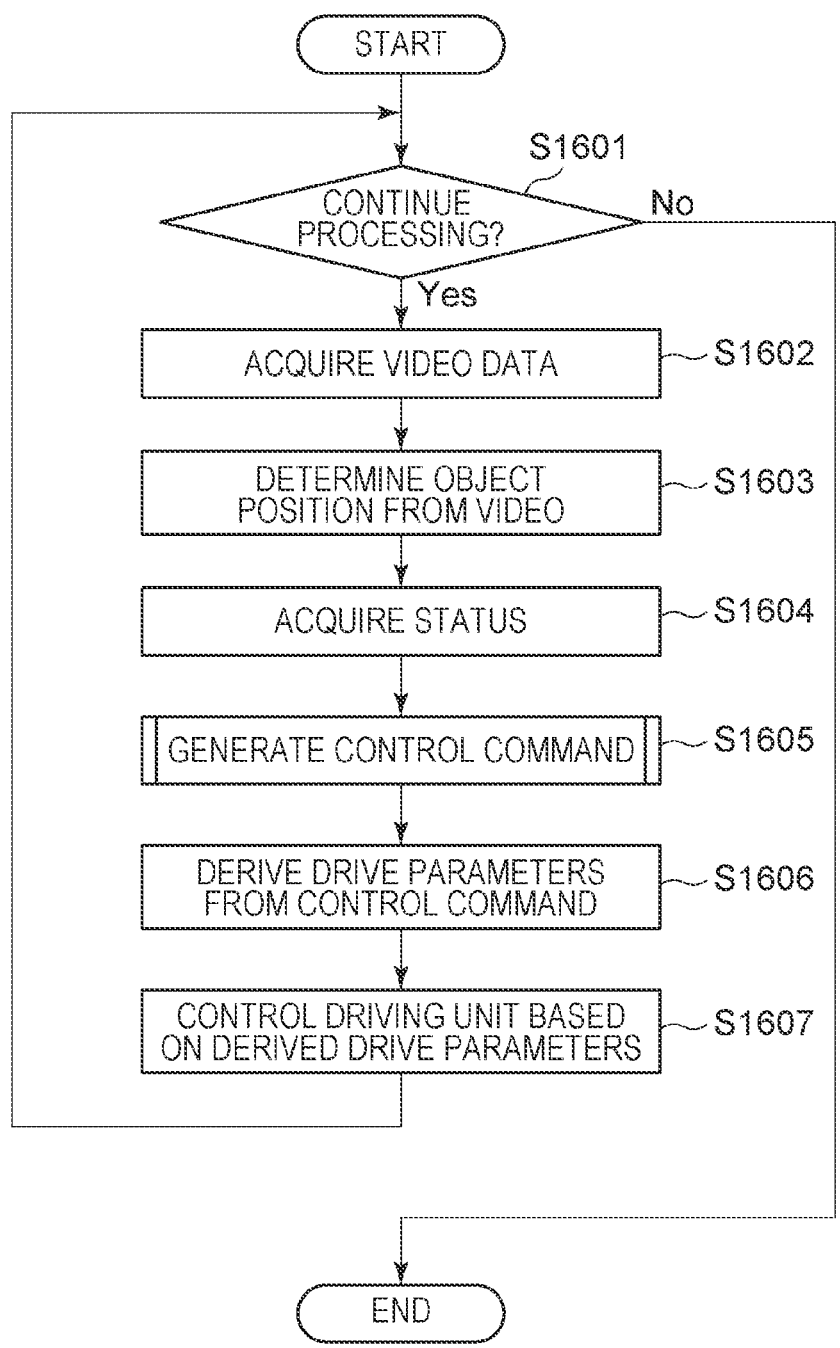
FIG. 16 is a flowchart for the operation of a camera in the fourth embodiment.

A process for a tracking operation performed by the camera 100 in this embodiment will be described with reference to the control process shown in FIG. 16. This control process is started when the CPU 101 of the camera 100 receives a command to execute an automatic tracking operation or an assisted manual control operation, described later via the network IF 105.

In step S1601, the CPU 101 determines whether to continue the process.

The CPU 101 determines whether a command to exit the process has been received via the network I/F 105. If yes, the process goes to step S1602, otherwise, this control process ends.

In step S1602, the CPU 101 acquires video data by reading image data acquired from the image sensor 107 via the image processing unit 106 from the RAM 103.

In step S1603, the camera 100 determines the position of the object in each frame of the captured video data. This step is executed by executing the process in step S103 with the CPU 101. The CPU 101 inputs the read image data to the inferring unit 111 and stores the object type and the positional information on the object on the captured video, inferred by the inferring unit 111, into the RAM 103. The inferring unit 111 includes a learned model created using a machine learning technique, such as deep learning, receives images as input data, and outputs, as output data, the type of the object, such as a human, positional information, and a score of the likelihood. The positional information is described as coordinates indicating the barycentric position of the object in the image, as in the above embodiments.

In step S1604, the CPU 101 inquires about the operating state of the driving unit 109 via the drive I/F 108. The operating state here includes the current panning angle, tilting angle, and zooming angle of view. The CPU 101 reads system settings, such as the resolution of the images, from the ROM 102 and the RAM 103.

In step S1605, the CPU 101 calculates a control command for the directions and the angular velocities for disposing the object at the image center according to the control process in FIG. 7A described in the first embodiment or the control process in FIG. 10 described in the second embodiment. For the calculation of the control command, the images read in step S1602 and the coordinates indicating the object position, calculated in step S1603, are used. The assisting process is basically performed according to the control process in FIG. 13, described in the third embodiment. The processes performed by the CPU 201 in the individual steps of the third embodiment are performed by the CPU 101 of the camera 100. In this embodiment, in step S1301, the CPU 101 determines whether the first control instruction has been received from the controller 300 via the network I/F 105. If the first control instruction has been received, the first control instruction is stored in the RAM 203, and the process goes to step S1302. If not, this control process ends. The exit operation is performed according to the control command for the directions and the angular velocities, calculated by the camera 100 itself, which allows an operation for tracking the object regardless of an external control command.

In step S1302, the CPU 101 measures the amount of communication delay between the camera 100 and the controller 300 via the network IF 105. Examples of the measuring method include, but not limited to, measuring the times from transmission of a control command to a response in all the communications and then averaging the times and measuring a response to a control request containing a specific command. The measured amount of communication delay is stored in the RAM 103 as the communication delay amount $L_{ctrl}$ between the camera 100 and the controller 300. The communication delay may be measured every time command is received, or alternatively, may be measured only at the first time or at regular intervals in consideration of a communication load.

In step S1303, the CPU 101 determines whether to take the communication delay on the system into account. First, the CPU 101 reads the delay determination threshold $L_T$ stored in the ROM 102. The value $L_T$ may be a fixed value or may be stored in the RAM 103 and dynamically switched according to the measurement. If $L_{ctrl}$ is greater than $L_T$, it is determined that a communication delay has occurred on the system, and the process goes to step S1304. If $L_{ctrl}$ is less than $L_T$, it is determined that there is no need to take the communication delay on the system into account, and the process goes to step S1305.

In step S1304, the CPU 101 reads the first control instruction received from the controller 300 and stored in the RAM 103 and extracts data about the directions contained in the control instruction. The CPU 101 further reads its own control command stored in the RAM 103 and replaces the information on the driving directions contained in the own control instruction with information on the directions extracted from the first control instruction to update the control command. The updated control command is stored in the RAM 103 again. This operation allows a control command to be produced on the basis of the information on the driving directions generated by the controller 300 and the information on the driving velocities generated by the camera 100.

In step S1305, the CPU 101 reads the control command received from the controller 300 from the RAM 103 and replaces the control command with its own control command to update it.

In other words, the control command of the camera 100 is replaced with the control command received from the controller 300 in the following control process, which is synonymous with control of the camera 100 with the controller 300.

Thus, in step S1605, the CPU 101 stores the control command for the driving directions and the angular velocities for disposing the object at the image center, calculated from the coordinates indicating the object position calculated in step S1603 into the RAM 103. Alternatively, the control command replaced with the directional information received from the controller 300 is stored in the RAM 103.

In step S1606, the CPU 101 derives drive parameters for panning/tilting in a desired direction at a desired velocity from the values in the control command calculated in step S1605. Specifically, the drive parameters are parameters for controlling motors (not shown) in the driving unit 109 for the X-axis direction and the Y-axis direction. The drive parameters may be obtained by converting the operating amounts contained in the received control command with reference to a conversion table stored in the RAM 103.

The operation in step S1607 is an operation similar to step S204, described in the manual control operation. The CPU 101 controls the driving unit 109 via the drive I/F 108 on the basis of the derived drive parameters. The driving unit 109 rotates on the basis of the parameters to change the image capturing direction of the camera 100, that is, to perform a pan/tilt operation. Thus, the pan/tilt operation of the camera 100 can be controlled using the driving velocities in the control command of the camera 100 and the driving directions in the control command of the controller 300, with the communication delay taken into account.

Display Control of Display Unit 305

In the first to fourth embodiments, the automatic tracking operation, the manual control operation, and the assisting operation are described. Some of the operating states are switched by the user, while others are switched internally, like the behavior of the assisting operation. Visually presenting the operating state to the user improves the operational feeling. Specifically, in the first to fourth embodiments, if the user controls the object to move to the target position, for example, the image center, or to be held at the image center, the velocity is decreased. Presenting the degree of the decrease in velocity to the user allows the user to recognize the operating amount and the change in the angle of view, enabling feed back to the subsequent user's operation. Image display control of the display unit 305 performed by the CPU 201 applicable to the first to fourth embodiments will be described.

Figure 17A:
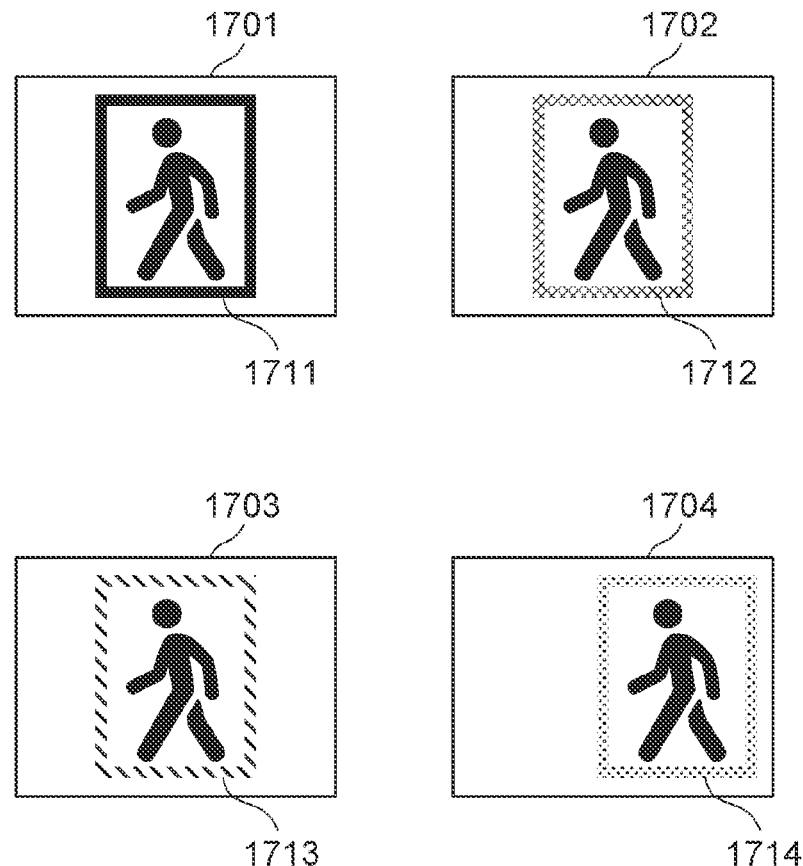
FIGS. 17A and 17B are diagrams illustrating the object position and the operating state of the system in the first to fourth embodiments.

A specific example of visual presentation of the operating state will be described with reference to FIG. 17A. Images 1701 to 1704 are images acquired from the camera 100, and patterns 1711 to 1714 are patterns superposed on the images 1701 to 1704 by the CPU 201, respectively. The patterns 1711 to 1714 differ in display form, such as color, line type, shape, or animation. The pattern 1711 is superposed on the image when a display instruction is received from the user in the manual control operation, and the pattern 1712 is superposed on the image when a display instruction is received from the user in the automatic tracking operation. The patterns 1713 and 1714 are displayed in the assisting operation. The pattern 1713 is superposed at a predetermined angular velocity (threshold) or lower, and the pattern 1714 is superposed on the image at the predetermined angular velocity or higher. In other words, the pattern 1713 corresponds to a display when the object position is near the center (within a first predetermined range at the center), and the pattern 1714 corresponds to a display when the object position is at an end of the angle of view (within a second predetermined range including an end of the angle of view). The pattern may be switched depending on, not whether the object position is at the image center as described in the first embodiment, but whether the velocity calculated according to the moving velocity of the object exceeds a predetermined threshold.

Figure 18:
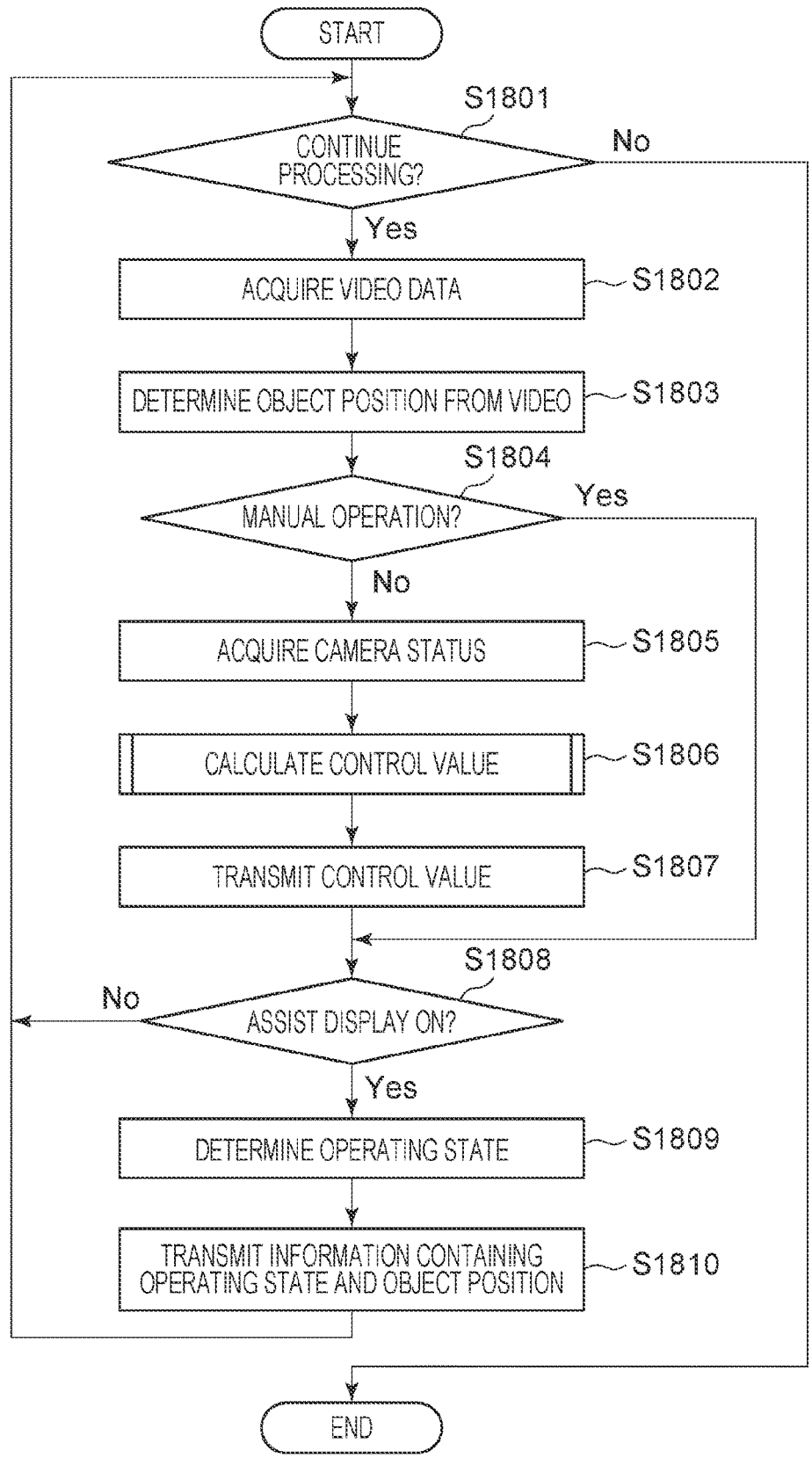
FIG. 18 is a flowchart for the operation of the information processing apparatus in a fifth embodiment.

FIG. 18 is a modification of the control process of the information processing apparatus 200, described with reference to FIG. 3, adapted to this embodiment. In FIG. 3, the process is started when an instruction to perform the automatic tracking operation or the assisted manual control operation is received. However, in this embodiment, the process is started when the CPU 201 receives an instruction to operate the camera 100 from the user. At that time, the CPU 201 stores an instruction for the manual operation, the automatic tracking operation, or the assisting operation in the RAM 203. The instruction of the user may be received from the controller 300 via the network I/F 204 or may be directly input via the user I/F 206. The CPU 201 can receive the instruction at any timing.

In step S1801, the CPU 201 determines the operating state. The CPU 201 determines whether an instruction to exit the manual operation, the automatic tracking operation, the assisting operation, or this control process has been received via the network I/F 204 or the user input I/F 206.

If the exit instruction has not been received, the process goes to step S1802. If the exit instruction has been received, the process ends.

Figure 17B:
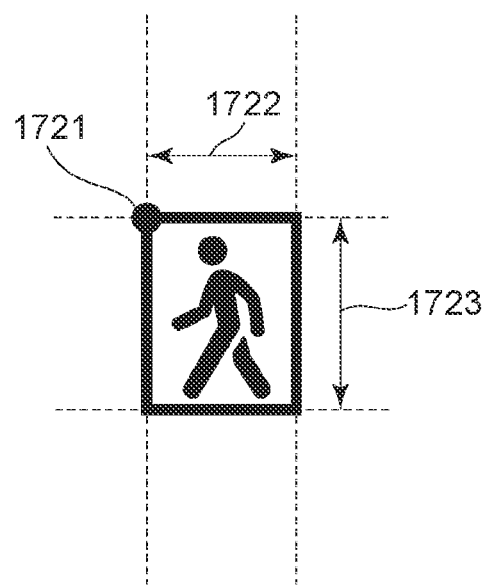

Since steps S1802 and S1803 are the same as steps S102 and S103, descriptions will be omitted. The positional information on the object in step S1803 to be stored in the RAM 203 contains not only the barycentric position but information indicating a rectangle containing the object. Examples of the information include information indicating the coordinates of an upper left point 1721, a width 1722, and a height 1723, as shown in FIG. 17B. Any information indicating the superposed pattern may be used.

In step S1804, the CPU 201 determines whether the operating state is the manual operation. If the operating state is the manual operation, there is no need to calculate the velocities using the object position, and the CPU 201 goes to step S1808. If the operating state is not the manual operation, the CPU 201 goes to step S1805.

Since steps S1805 to S1807 are the same as steps S104 to S106, descriptions thereof will be omitted.

In step S1808, the CPU 201 determines whether an instruction to perform the assist display described with reference to FIG. 17A has been received via the network I/F 204 or the user input I/F 206. If the display is to be performed, the CPU 201 goes to step S1809, otherwise, goes to step S1801.

In step S1809, the CPU 201 determines the operating state including the type of assist display. In other words, the CPU 201 determines, in addition to whether the operating state is the manual control operation or the automatic tracking operation, the magnitude of the angular velocity contained in the second control instruction, calculated in step S1806. In the case of the manual operation, the CPU 201 stores information indicating the pattern 1711, while in the case of the automatic tracking operation, the CPU 201 stores information indicating the pattern 1712 into the RAM 203. In the case of the assisting operation, the CPU 201 reads the threshold $V_P$ stored in advance in the ROM 202 or the RAM 203. The CPU 201 reads the angular velocity contained in the second control instruction stored in the RAM 203, and if the angular velocity is less than or equal to the threshold $V_P$, the CPU 201 stores information indicating the pattern 1713, and if greater than the threshold $V_P$, stores information indicating the pattern 1714 into the RAM 203. After storing any of the pattern information, the CPU 201 goes to step S1810.

In step S1810, the CPU 201 transmits the pattern information stored in the RAM 203 in step S1809, that is, information indicating the operating state, and the positional information on the object stored in the RAM 203 in step S1803 to the controller 300 via the network IF 204.

Figure 5:
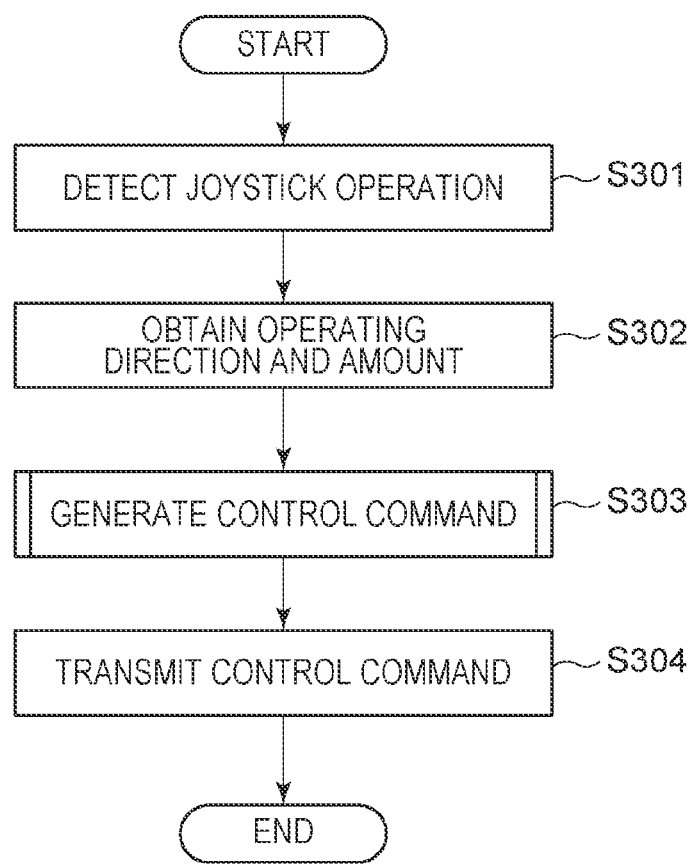
FIG. 5 is a flowchart for the operation of a controller.
Figure 19:
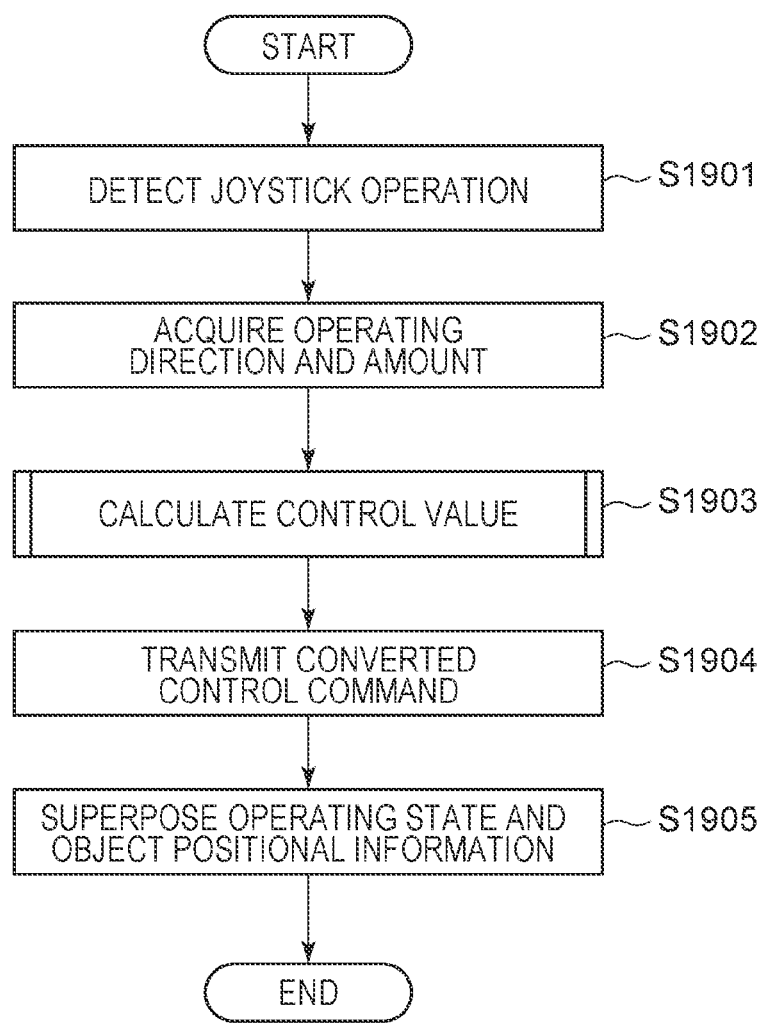
FIG. 19 is a flowchart for the operation of the controller in the fifth embodiment.

FIG. 19 shows a modification of the control process performed by the controller 300, described in FIG. 5, adapted to this embodiment. Since steps S1901 to S1904 are the same as steps S301 to S304, descriptions thereof will be omitted.

In step S1905, the CPU 301 of the controller 300 receives positional information on the object and the operating state transmitted from the information processing apparatus 200 via the network IF 304. The obtained operating state is information corresponding to any of the patterns 1711 to 1714. The CPU 301 superposes the pattern on the image received from the camera 100 using the received information, as shown in FIG. 17A. The image on which the pattern is superposed is displayed to the user by the CPU 301 using the display unit 305 of the controller 300.

Thus, visually presenting the assist status to the user, like the patterns 1711 to 1714 in different display forms, allows the user to visually recognize the assist control, such as pan/tilt, in addition to its own operation. This reduces the possibility of causing undesired operation, which can occur due to the inability to recognize the assist status, to allow high-quality camera work even under difficult conditions, thereby providing advantageous effects specific to this control.

In the embodiment, the information processing apparatus 200 transmits the positional information on the object and the operating state. Alternatively, the information processing apparatus 200 may transmit image on which a pattern is superposed to the controller 300 so that the controller 300 can display the received images. In other words, in step S1810, the CPU 201 superposes a pattern on each image using information read from the RAM 203 and transmits the images to the controller 300 via the network IF 204. In step S1905, the CPU 301 may display the received images.

Figure 20:
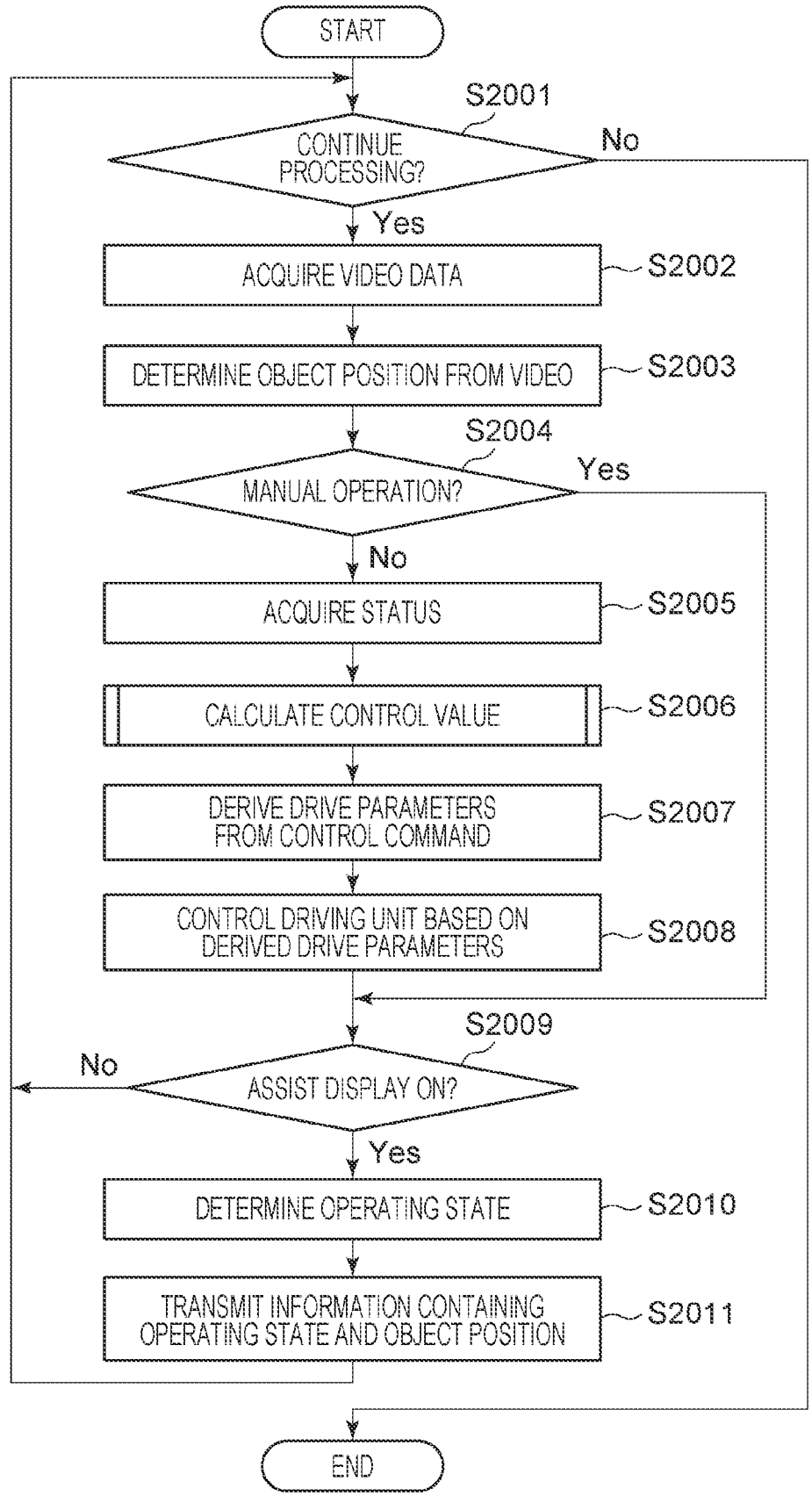
FIG. 20 is a flowchart for the operation of the camera in a sixth embodiment.

The advantageous effects of the display control described above can also be provided by the fourth embodiment with the system configuration shown in FIG. 14. The control process shown in FIG. 20 is a flowchart in which the control process of the camera 100 described with reference to FIG. 16 and the control process of the information processing apparatus 200 described with reference to FIG. 18 are equally combined.

In step S2001, the CPU 101 determines the operating state, as in step S1801. The CPU 101 determines whether an instruction to exit the manual operation, automatic tracking operation, assisting operation, or this control process has been received via the network I/F 105. If the exit instruction has not been received, the process goes to step S2002. If the exit instruction has been received, this process is terminated.

Since steps S2002 to S2003 are the same as steps S1602 to S1603, descriptions thereof will be omitted. The positional information on the object to be stored in the RAM 103 contains formation indicating a rectangle containing the object, shown in FIG. 17B, as in the fifth embodiment.

In step S2004, the CPU 101 determines whether the operating state is the manual operation, as in step S1804. If the operating state is the manual operation, there is no need to calculate the velocities using the object position, and the CPU 101 goes to step S2009. If the operating state is not the manual operation, the CPU 101 goes to step S2005.

Since steps S2005 to S2007 are the same as steps S1605 to S1607, descriptions thereof will be omitted.

In step S2009, the CPU 101 determines whether an instruction to perform the assist display described with reference to FIG. 17A has been received via the network I/F 105, as in step S1808. If the display is to be performed, the CPU 101 goes to step S2010, otherwise, goes to step S2001.

In step S2010, the CPU 101 determines the operating state including the type of assist display, as in step S1809. In other words, the CPU 101 determines, in addition to whether the operating state is the manual control operation or the automatic tracking operation, the magnitude of the angular velocity contained in the second control instruction, calculated in step S2006.

In the case of the manual operation, the CPU 101 stores information indicating the pattern 1711, while in the case of the automatic tracking operation, the CPU 101 stores information indicating the pattern 1712 into the RAM 103. In the case of the assisting operation, the CPU 101 reads the threshold $V_P$ stored in advance in the ROM 102 or the RAM 103. The CPU 101 reads the angular velocity contained in the second control instruction stored in the RAM 103, and if the angular velocity is less than or equal to the threshold $V_P$, the CPU 101 stores information indicating the pattern 1713, and if greater than the threshold $V_P$, stores information indicating the pattern 1714 into the RAM 103. After storing any of the pattern information, the CPU 101 goes to step S2011.

As in step S1810, in step S2011, the CPU 101 transmits the pattern information stored in the RAM 103 in step S2010, that is, information indicating the operating state, and the positional information on the object stored in the RAM 103 in step S2003 to the controller 300 via the network IF 105. The CPU 101 may transmit the result of superposition of the pattern on the image by itself using the image processing unit 106 to the controller 300.

The CPU 301 of the controller 300 performs the same process as in FIG. 19 to present images on which a pattern is superposed to the user using the display unit 305.

This provides the same advantageous effects as in FIG. 19.

In the operation process including the display control described above, the operating state is determined using the magnitude of the angular velocity contained in the second control instruction. Alternatively, the object position itself may be used to determine the operating state. In other words, if the object position is a predetermined distance or less separated from the image center or the target position at which the object is to be held, it may be determined to be the assist status, and if the object position is the predetermined distance or more separated, it may be determined to be the manual operation, and information indicating the individual operating states may be transmitted. This allows, for the image center (or in the vicinity of the target position), the velocity to be adjusted by assist control, and for outside the angle of view (or a position away from the target position), the manual operation by the user to be performed. The combination of the predetermined distance and the operating state is given for illustration and is not intended to limit the invention. Unlike the above examples, for example, if the object position is at the predetermined distance or less, it may be determined to be in the manual operation, and if larger than the predetermined distance, it may be determined to be in the assist status.

For the image center (or the vicinity of the target position), fine adjustment by the user may be employed, and for outside the angle of view (or a position away from the target position), the assisting operation may be employed to correct the velocities. Thus, transmitting the operating state determined according to the predetermined distance together with the object position allows the form of the pattern received and displayed by the controller 300 to be changed and displayed to the user, providing the same advantageous effects.

Other Embodiments

The process for updating the control command according to a communication delay has been described. Alternatively, information on the communication delay may be presented to the user so that the control command may be switched according to an instruction from the user. For example, in the information processing apparatus 200, whether to execute communication delay processing from the user's operation via the network I/F 204 or the user input I/F 206. In the third and fourth embodiments, if no control command has been received, the camera 100 or the information processing apparatus 200 calculates the directions and the angular velocities from the captured images and the inference and executes the automatic tracking operation. However, whether to execute the automatic tracking operation may be determined according to a user's operation.

The operation for switching between the second control instruction generated by the information processing apparatus 200 and the first control instruction generated by the controller 300 according to the amount of communication delay may be modified. For example, the angular velocities in the first control instruction and the second control instruction may be multiplied together at a predetermined ratio to generate the third control instruction. The first control instruction or the second control instruction may be selected according to the distance between the object position and the image center or the position at which the object is to be held. Thus, transmitting the operating state determined from the predetermined distance together with the object position allows the form of the pattern received and displayed by the controller 300 to be changed and displayed to the user, providing the same advantageous effects.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments, but is defined by the scope of the following claims.

This application claims the benefit of Japanese Patent Application No. 2022-111882, filed Jul. 12, 2022 and No. 2022-148288, filed Sep. 16, 2022, which are hereby incorporated by reference herein in their entirety.

What is claimed is:

1. An image capturing system comprising:
a first control apparatus;
a second control apparatus; and
an image capturing apparatus,
wherein the first control apparatus is configured:
a first control receiving unit configured to receive an operation from a user; and
transmit a first control instruction based on the operation to the image capturing apparatus,
wherein the second control apparatus is configured to:
receive a captured image from the image capturing apparatus;
generate a second control instruction based on the captured image; and
transmit the second control instruction to the image capturing apparatus,
wherein the image capturing apparatus includes: an image capturing device, and configured to:
receive the first control instruction from the first control apparatus and the second control instruction from the second control apparatus, and
control an image capturing process performed by the image capturing device based on at least one of the first control instruction and the second control instruction,
wherein, in a case where time from when the first control apparatus transmits the first control instruction to when the image capturing apparatus receives the first control instruction is longer than time from when the second control apparatus transmits the second control instruction to when the image capturing apparatus receives the second control instruction, the image capturing apparatus controls the image capturing process based on the first control instruction and the second control instruction.

2. The image capturing system according to claim 1, wherein the image capturing apparatus is further configured to drive the image capturing device, and
wherein the image capturing process is a process for changing an image capturing direction by driving the image capturing device with the image capturing apparatus.

3. The image capturing system according to claim 2, wherein the first control instruction contains a control instruction regarding an image capturing direction, and the second control instruction contains a control instruction regarding a velocity for changing the image capturing direction, and
wherein the image capturing apparatus controls the image capturing process with a combination of the control instruction regarding the image capturing direction contained in the first control instruction and the control instruction regarding the velocity for changing the image capturing direction contained in the second control instruction.

4. The image capturing system according to claim 1, wherein, when enabling of an assisting operation is selected, the image capturing apparatus controls the image capturing process based on the first control instruction and the second control instruction, and
wherein, when the enabling of the assisting operation is not selected, the image capturing apparatus controls the image capturing process based on the first control instruction or the second control instruction.

5. The image capturing system according to claim 1, wherein, when a difference between a first communication time taken for communication from when the first control instruction is transmitted by the first control apparatus to when the first control instruction is received by the image capturing apparatus and a second communication time taken for communication from when the second control instruction is transmitted by the second control apparatus to when the first control instruction is received by the image capturing apparatus is greater than a threshold, the image capturing apparatus controls the image capturing process based on the first control instruction and the second control instruction.

6. The image capturing system according to claim 5, wherein, when the difference between the first communication time and the second communication time is less than or equal to the threshold, the image capturing apparatus controls the image capturing process based on the first control instruction or the second control instruction.

7. The image capturing system according to claim 6, wherein, when the difference between the first communication time and the second communication time is less than or equal to the threshold, the image capturing apparatus controls the image capturing process based on the first control instruction.

8. The image capturing system according to claim 5, wherein, when enabling of an assisting operation is selected and the difference between the first communication time and the second communication time is greater than the threshold, the image capturing apparatus controls the image capturing process based on the first control instruction and the second control instruction, and
wherein, when the enabling of the assisting operation is not selected, or when the difference between the first communication time and the second communication time is less than or equal to the threshold, the image capturing apparatus controls the image capturing process based on the first control instruction or the second control instruction.

9. The image capturing system according to claim 1, wherein the second control apparatus is further configured to:
detect positional information on an object in the captured image;
determine an operating state regarding assist of the operation of the user based on the positional information on the object; and
transmit the positional information on the object and the operating state to the first control apparatus,
wherein the first control apparatus is further configured to:

receive the positional information on the object and the operating state; and display the captured image, on which a pattern indicating a position of the object specified by the received positional information is superposed, the pattern being displayed in a form based on information indicating the operating state.

10. A control apparatus comprising:
one or more memories storing instructions; and
one or more processors executing the instructions to:
receive a first control instruction based on an operation performed by a user;
generate a second control instruction based on an image received from outside;
generate a third control instruction based on the first control instruction and the second control instruction; and
transmit the third control instruction to outside,
wherein a first communication time from when the first control instruction is transmitted to when the first control instruction is received is longer than a second communication time from when the third control instruction is transmitted to when the third control instruction is received, and
wherein a difference between the first communication time and the second communication time is greater than a threshold.

11. The control apparatus according to claim 10,
wherein, when the first communication time is longer than the second communication time and the difference between the first communication time and the second communication time is greater than the threshold, the third control instruction is transmitted, and
wherein, when the difference between the first communication time and the second communication time is less than or equal to the threshold, the first control instruction is transmitted.

12. The control apparatus according to claim 10,
wherein, when enabling of an assisting operation is selected, the third control instruction is transmitted, and
wherein, when the enabling of the assisting operation is not selected, the first control instruction is transmitted.

13. The control apparatus according to claim 11,
wherein, when enabling of an assisting operation is selected, the first communication time is longer than the second communication time, and the difference between the first communication time and the second communication time is greater than the threshold, the third control instruction is transmitted,
wherein, when enabling of the assisting operation is not selected, or when the difference between the first communication time and the second communication time is less than or equal to the threshold, the second control instruction is transmitted.

14. The control apparatus according to claim 10, wherein the third control instruction is generated based on information on a driving direction specified in the first control instruction and information on a driving velocity specified in the second control instruction.

15. The control apparatus according to claim 10, wherein the one or more processors further execute the instructions to:
detect positional information on an object from the image;
determine an operating state regarding assist of the operation of the user based on the positional information on the object; and
transmit the positional information on the object and the operating state to outside.

16. An image capturing apparatus comprising:
one or more memories storing instructions; and
one or more processors executing the instructions to:
receive a first control instruction based on an operation performed by a user;
generate a second control instruction according to a captured image;
generate a third control instruction based on the first control instruction and the second control instruction; and
control an image capturing process based on the third control instruction,
wherein, when a first communication time from when the first control instruction is transmitted to when the first control instruction is received is longer than a threshold, the image capturing process is controlled based on the third control instruction, and
wherein, when the first communication time is less than or equal to the threshold, the image capturing process is controlled based on the first control instruction.

17. The image capturing apparatus according to claim 16, wherein the one or more processors further execute the instructions to measure the first communication time.

18. The image capturing apparatus according to claim 16, wherein, when the first control instruction is not received, the image capturing process is controlled based on the second control instruction.

19. The image capturing apparatus according to claim 16, wherein the third control instruction is generated based on information on a driving direction specified in the first control instruction and information on a driving velocity specified in the second control instruction.

20. The image capturing apparatus according to claim 16, wherein the one or more processors further execute the instructions to:
detect positional information on an object from the image;
determine an operating state regarding assist of the operation of the user based on the positional information on the object; and
transmit the positional information on the object and the operating state to outside.

21. An image capturing apparatus comprising:
one or more memories storing instructions; and
one or more processors executing the instructions to:
receive a first control instruction based on an operation performed by a user;
generate a second control instruction according to a captured image;
generate a third control instruction based on the first control instruction and the second control instruction;
control an image capturing process based on the third control instruction; and
select enabling of an assisting operation for assisting the operation,
wherein, when the enabling of the assisting operation is selected, the image capturing process is controlled based on the third control instruction, and
wherein, when the enabling of the assisting operation is not selected, the image capturing process is controlled based on the first control instruction or the second control instruction.

22. A control method for an image capturing system comprising a first control apparatus, a second control apparatus, and an image capturing apparatus, the method comprising:

receiving an operation from a user via the first control apparatus;

transmitting a first control instruction based on the operation to the image capturing apparatus;

generating, using the second control apparatus, a second control instruction based on an image captured by the image capturing apparatus;

transmitting the second control instruction to the image capturing apparatus, receiving the first control instruction and the second control instruction, and controlling an image capturing process performed by the image capturing apparatus based on the first control instruction and the second control instruction, wherein time from when the first control apparatus transmits the first control instruction to when the image capturing apparatus receives the first control instruction is longer than time from when the second control apparatus transmits the second control instruction to when the image capturing apparatus receives the second control instruction.

23. The control method for the image capturing system according to claim 22, the method further comprising:

under control of the second control apparatus, detecting, positional information on an object in the captured image;

determining an operating state regarding assist of the operation of the user based on the positional information on the object; and transmitting the positional information on the object and the operating state to the first control apparatus, under control of the first control apparatus, receiving the positional information on the object and the operating state; and displaying the captured image on which a pattern indicating a position of the object specified by the received positional information is superposed, the pattern being displayed in a form based on information indicating the operating state.

24. A control method for an image capturing system comprising a first control apparatus and an image capturing apparatus, the method comprising:

receiving an operation from a user via the first control apparatus;

transmitting a first control instruction based on the operation to the image capturing apparatus;

generating a second control instruction based on a captured image; and receiving the first control instruction;

when a first communication time from when the first control apparatus transmits the first control instruction to when the image capturing apparatus receives the first control instruction is longer than a threshold, controlling an image capturing process based on the first control instruction and the second control instruction; and when the first communication time is less than or equal to the threshold, controlling the image capturing process based on the first control instruction.

25. The control method for the image capturing system according to claim 24, the method comprising:

detecting positional information on an object in the captured image;

determining an operating state regarding assist of the operation of the user based on the positional information on the object; and transmitting the positional information on the object and the operating state to outside.

* * * * *